US012581249B2

(12) United States Patent
Zhang et al.

(10) Patent No.: US 12,581,249 B2
(45) **Date of Patent: *Mar. 17, 2026**

(54) SYSTEMS AND METHODS FOR SUPPRESSING SOUND LEAKAGE

(71) Applicant: SHENZHEN SHOKZ CO., LTD., Shenzhen (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN); Peigeng Tong, Shenzhen (CN); Guolin Xie, Shenzhen (CN); Yongjian Li, Shenzhen (CN); Jiang Xu, Guangdong (CN); Tao Zhao, Shenzhen (CN); Duoduo Wu, Shenzhen (CN); Ao Ji, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 221 days.

This patent is subject to a terminal disclaimer.

(21) Appl. No.: 18/473,206

(22) Filed: Sep. 22, 2023

(65) Prior Publication Data

US 2024/0015455 A1 Jan. 11, 2024

Related U.S. Application Data

(63) Continuation-in-part of application No. 18/332,747, filed on Jun. 11, 2023, which is a continuation of (Continued)

(30) Foreign Application Priority Data

Jan. 6, 2014 (CN) ........................ 201410005804.0
Apr. 30, 2019 (CN) ........................ 201910364346.2

(Continued)

(51) Int. Cl.
*H04R 25/00* (2006.01)
*G10K 9/13* (2006.01)

(Continued)

(52) U.S. Cl.
CPC ............. *H04R 25/505* (2013.01); *G10K 9/13* (2013.01); *G10K 9/22* (2013.01); *G10K 11/175* (2013.01);

(Continued)

(58) Field of Classification Search
CPC ........ H04R 7/16; H04R 1/1016; H04R 1/105; H04R 1/323; H04R 9/025; H04R 9/06;

(Continued)

(56) References Cited

U.S. PATENT DOCUMENTS 2,327,320 A 8/1943 Shapiro
4,987,597 A 1/1991 Haertl (Continued)

FOREIGN PATENT DOCUMENTS

CN 201616895 U 10/2010
CN 201690580 U 12/2010

(Continued)

OTHER PUBLICATIONS

Translation of CN 209330353 U. Chen, Z. "Bluetooth Earphone" (Year: 2019).*

(Continued)

*Primary Examiner* — Brian Ensey
(74) *Attorney, Agent, or Firm* — METIS IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole (Continued)

guides the sound wave inside the housing through the at least one sound guiding hole to an outside of the housing. The guided sound wave interferes with the leaked sound wave in a target region. The interference at a specific frequency relates to a distance between the at least one sound guiding hole and the portion of the housing.

20 Claims, 25 Drawing Sheets

Related U.S. Application Data application No. PCT/CN2023/079410, filed on Mar. 2, 2023, and a continuation-in-part of application No. 17/219,882, filed on Apr. 1, 2021, now Pat. No. 11,832,060, which is a continuation-in-part of application No. 17/170,920, filed on Feb. 9, 2021, now Pat. No. 11,122,359, and a continuation-in-part of application No. 17/074,762, filed on Oct. 20, 2020, now Pat. No. 11,197,106, said application No. 17/170,920 is a continuation of application No. PCT/CN2020/087002, filed on Apr. 26, 2020, said application No. 17/074,762 is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978.

(30) Foreign Application Priority Data

Sep. 19, 2019 (CN) ......................... 201910888067.6
Sep. 19, 2019 (CN) ......................... 201910888762.2
Dec. 1, 2022 (CN) ......................... 202211336918.4
Dec. 1, 2022 (CN) ......................... 202223239628.6
Dec. 30, 2022 (WO) ................ PCT/CN2022/144339

(51) Int. Cl.

*G10K 9/22* (2006.01)
*G10K 11/175* (2006.01)
*G10K 11/178* (2006.01)
*G10K 11/26* (2006.01)
*H04R 1/28* (2006.01)
*H04R 9/06* (2006.01)
*H04R 17/00* (2006.01)

(52) U.S. Cl.

CPC ............ *G10K 11/178* (2013.01); *G10K 11/26* (2013.01); *H04R 1/2811* (2013.01); *H04R 9/066* (2013.01); *G10K 2210/3216* (2013.01); *H04R 1/2876* (2013.01); *H04R 17/00* (2013.01); *H04R 2460/13* (2013.01)

(58) Field of Classification Search

CPC .... H04R 9/045; H04R 2400/11; H04R 1/025; H04R 1/10; H04R 1/1066; H04R 1/2803; H04R 2307/029; H04R 2420/07; H04R 1/2826; H04R 7/06; H04R 7/127; H04R 7/18; H04R 1/1008; H04R 7/12; H04R 2307/207; H04R 2499/11; H04R 1/1075; H04R 9/02; H04R 2201/10; H04R 2307/023

See application file for complete search history.

(56) References Cited

U.S. PATENT DOCUMENTS 5,327,506 A 7/1994 Stites, III
5,430,803 A 7/1995 Kimura et al.
5,692,059 A 11/1997 Kruger
5,757,935 A 5/1998 Kang et al.
5,790,684 A 8/1998 Niino et al.
6,062,337 A 5/2000 Zinserling
6,478,108 B1 11/2002 Linhard et al.
6,850,138 B1 2/2005 Sakai
8,141,678 B2 3/2012 Ikeyama et al.
9,226,075 B2 12/2015 Lee
9,729,978 B2 8/2017 Qi et al.
10,149,071 B2 12/2018 Qi et al.
10,334,372 B2 6/2019 Qi et al.
10,506,362 B1 12/2019 Gomes
10,555,106 B1 2/2020 Mehra
10,609,465 B1 3/2020 Wakeland et al.
10,631,075 B1 4/2020 Patil et al.
10,897,677 B2 1/2021 Walraevens et al.
11,122,359 B2 9/2021 Zhang et al.
11,197,106 B2 12/2021 Qi et al.
11,582,563 B2 2/2023 Qi et al.
11,622,212 B2 4/2023 Qi et al.
11,743,627 B2 8/2023 Zhang et al.
2003/0048913 A1 3/2003 Lee et al.
2004/0131219 A1 7/2004 Polk, Jr.
2005/0251952 A1 11/2005 Johnson
2006/0094481 A1 5/2006 Gullickson
2006/0098829 A1 5/2006 Kobayashi
2007/0009133 A1 1/2007 Gerkinsmeyer
2007/0034493 A1 2/2007 Kawasaki et al.
2007/0041595 A1 2/2007 Carazo et al.
2007/0098198 A1 5/2007 Hildebrandt
2007/0237341 A1 10/2007 Laroche
2007/0274556 A1 11/2007 Matsumura et al.
2008/0144874 A1 6/2008 Wu et al.
2008/0287063 A1 11/2008 Kidron et al.
2009/0095613 A1 4/2009 Lin
2009/0127020 A1 5/2009 Connor
2009/0141920 A1 6/2009 Suyama
2009/0147981 A1 6/2009 Blanchard et al.
2009/0190781 A1 7/2009 Fukuda
2009/0208031 A1 8/2009 Abolfathi
2009/0279729 A1 11/2009 Huang
2009/0285417 A1 11/2009 Shin et al.
2009/0290730 A1 11/2009 Fukuda et al.
2009/0304209 A1 12/2009 Nakatani
2010/0054492 A1 3/2010 Eaton et al.
2010/0080400 A1 4/2010 Sibbald et al.
2010/0310106 A1 12/2010 Blanchard et al.
2010/0322454 A1 12/2010 Ambrose et al.
2011/0150262 A1 6/2011 Nakama et al.
2011/0170730 A1 7/2011 Zhu
2012/0020501 A1 1/2012 Lee
2012/0070022 A1 3/2012 Saiki
2012/0177206 A1 7/2012 Yamagishi et al.
2012/0201406 A1 8/2012 Yamaguchi
2012/0300956 A1 11/2012 Hori
2013/0051585 A1 2/2013 Karkkainen et al.
2013/0108068 A1 5/2013 Poulsen et al.
2013/0188803 A1* 7/2013 Shaanan .................. H04R 1/10
381/74
2013/0329919 A1 12/2013 He
2014/0009008 A1 1/2014 Li et al.
2014/0064533 A1 3/2014 Kasic
2014/0185822 A1 7/2014 Kunimoto et al.
2014/0185837 A1 7/2014 Kunimoto et al.
2014/0274229 A1 9/2014 Fukuda
2014/0294182 A1 10/2014 Axelsson et al.
2014/0315605 A1 10/2014 Cho et al.
2014/0355777 A1 12/2014 Nabata et al.

(56) References Cited

U.S. PATENT DOCUMENTS

| | | | |
|---|---|---|---|
| 2015/0030189 | A1 | 1/2015 | Nabata et al. |
| 2015/0055814 | A1 | 2/2015 | Liu |
| 2015/0256656 | A1 | 9/2015 | Hori |
| 2015/0264473 | A1 | 9/2015 | Fukuda |
| 2015/0268673 | A1 | 9/2015 | Farzbod et al. |
| 2015/0326967 | A1 | 11/2015 | Otani |
| 2016/0037243 | A1 | 2/2016 | Lippert et al. |
| 2016/0037256 | A1 | 2/2016 | Katsuda et al. |
| 2016/0050474 | A1 | 2/2016 | Rye et al. |
| 2016/0150337 | A1 | 5/2016 | Nandy |
| 2016/0165357 | A1 | 6/2016 | Morishita et al. |
| 2016/0295328 | A1 | 10/2016 | Park |
| 2016/0329041 | A1 | 11/2016 | Qi et al. |
| 2017/0201823 | A1 | 7/2017 | Shetye et al. |
| 2017/0223445 | A1 | 8/2017 | Bullen et al. |
| 2017/0230741 | A1 | 8/2017 | Masuo et al. |
| 2018/0167710 | A1 | 6/2018 | Silver et al. |
| 2018/0182370 | A1 | 6/2018 | Hyde et al. |
| 2018/0376231 | A1 | 12/2018 | Pfaffinger |
| 2019/0014425 | A1 | 1/2019 | Liao et al. |
| 2019/0052954 | A1 | 2/2019 | Rusconi Clerici Beltrami et al. |
| 2019/0238971 | A1 | 8/2019 | Wakeland et al. |
| 2019/0320258 | A1 | 10/2019 | Ohura |
| 2020/0100035 | A1 | 3/2020 | Sanger et al. |
| 2020/0137476 | A1 | 4/2020 | Shinmen et al. |
| 2020/0169801 | A1 | 5/2020 | Zhu |
| 2020/0196062 | A1 | 6/2020 | Zhang |
| 2020/0252708 | A1 | 8/2020 | Zhu |
| 2020/0367008 | A1 | 11/2020 | Walsh et al. |
| 2021/0067857 | A1 | 3/2021 | Struzik |
| 2021/0099027 | A1 | 4/2021 | Larsson et al. |
| 2021/0219059 | A1 | 7/2021 | Qi et al. |
| 2022/0124428 | A1 | 4/2022 | Zheng et al. |
| 2022/0312108 | A1 | 9/2022 | Zhang et al. |
| 2023/0130211 | A1 | 4/2023 | Li et al. |
| 2023/0179907 | A1 | 6/2023 | Zhang et al. |
| 2024/0276155 | A1 | 8/2024 | Li et al. |

FOREIGN PATENT DOCUMENTS

| | | | |
|---|---|---|---|
| CN | 102014328 | A | 4/2011 |
| CN | 102421043 | A | 4/2012 |
| CN | 202435600 | U | 9/2012 |
| CN | 103167390 | A | 6/2013 |
| CN | 103347235 | A | 10/2013 |
| CN | 204206450 | U | 3/2015 |
| CN | 106792304 | A | 5/2017 |
| CN | 109547888 | A | 3/2019 |
| CN | 109640209 | A | 4/2019 |
| CN | 212909891 | U | 4/2021 |
| CN | 214014497 | U | 8/2021 |
| CN | 113573215 | A | 10/2021 |
| CN | 114286228 | A | 4/2022 |
| CN | 216357224 | U | 4/2022 |
| CN | 115175069 | A | 10/2022 |
| EP | 2011367 | B1 | 12/2014 |
| JP | S5977795 | A | 5/1984 |
| JP | 2001326986 | A | 11/2001 |
| JP | 2006332715 | A | 12/2006 |
| JP | 2007251358 | A | 9/2007 |
| KR | 20050030183 | A | 3/2005 |
| KR | 20090082999 | A | 8/2009 |
| KR | 20170133754 | A | 12/2017 |
| WO | 2004095878 | A2 | 11/2004 |
| WO | 2015087093 | A1 | 6/2015 |
| WO | 2021133679 | A1 | 7/2021 |

OTHER PUBLICATIONS

International Search Report in PCT/CN2014/094065 mailed on Mar. 17, 2015, 5 pages.
Written Opinion in PCT/CN2014/094065 mailed on Mar. 17, 2015, 10 pages.
First Office Action in Chinese Application No. 201410005804.0 mailed on Dec. 7, 2015, 9 pages.
Notice of Reasons for Refusal in Japanese Application No. 2016545828 mailed on Jun. 20, 2017, 10 pages.
The Extended European Search Report in European Application No. 14877111.6 mailed on Mar. 17, 2017, 6 pages.
First Examination Report in Indian Application No. 201617026062 malled on Nov. 13, 2020, 6 pages.
International Search Report in PCT/CN2020/087002 mailed on Jul. 14, 2020, 4 pages.
Written Opinion in PCT/CN2020/087002 mailed on Jul. 14, 2020, 5 pages.
Notice of Preliminary Rejection in Korean Application No. 10-2022-7010046 mailed on Jun. 20, 2022, 15 pages.
Notice of Rejection in Japanese Application No. 2024-550245 mailed on Sep. 2, 2025, 9 pages.
Notice of Preliminary Rejection in Korean Application No. 10-2024-7028850 mailed on Aug. 25, 2025, 8 pages.

* cited by examiner

SYSTEMS AND METHODS FOR SUPPRESSING SOUND LEAKAGE

CROSS-REFERENCE TO RELATED APPLICATIONS

The present application is a continuation-in-part of U.S. patent application Ser. No. 17/219,882, filed on Apr. 1, 2021, which is a continuation-in-part of U.S. patent application Ser. No. 17/074,762 (now U.S. Pat. No. 11,197,106) filed on Oct. 20, 2020, which is a continuation-in-part of U.S. patent application Ser. No. 16/813,915 (now U.S. Pat. No. 10,848, 878) filed on Mar. 10, 2020, which is a continuation of U.S. patent application Ser. No. 16/419,049 (now U.S. Pat. No. 10,616,696) filed on May 22, 2019, which is a continuation of U.S. patent application Ser. No. 16/180,020 (now U.S. Pat. No. 10,334,372) filed on Nov. 5, 2018, which is a continuation of U.S. patent application Ser. No. 15/650,909 (now U.S. Pat. No. 10,149,071) filed on Jul. 16, 2017, which is a continuation of U.S. patent application Ser. No. 15/109, 831 (now U.S. Pat. No. 9,729,978) filed on Jul. 6, 2016, which is a U.S. National Stage entry under 35 U.S.C. § 371 of International Application No. PCT/CN2014/094065, filed on Dec. 17, 2014, designating the United States of America, which claims priority to Chinese Patent Application No. 201410005804.0, filed on Jan. 6, 2014; the present application is also a continuation-in-part of U.S. patent application Ser. No. 18/332,747, filed on Jun. 11, 2023, which is a continuation of International Patent Application No. PCT/CN2023/079410, filed on Mar. 2, 2023, which claims priority of Chinese Patent Application No. 202211336918.4, filed on Oct. 28, 2022, Chinese Patent Application No. 202223239628.6, filed on Dec. 1, 2022, and International Application No. PCT/CN2022/144339, filed on Dec. 30, 2022; the U.S. patent application Ser. No. 17/219,882 is also a continuation-in-part of U.S. patent application Ser. No. 17/170,920 (now U.S. Pat. No. 11,122,359) filed on Feb. 9, 2021, which is a continuation of International Application No. PCT/CN2020/087002, filed on Apr. 26, 2020, which claims priority to Chinese Patent Application No. 201910888067.6, filed on Sep. 19, 2019, Chinese Patent Application No. 201910888762.2, filed on Sep. 19, 2019, and Chinese Patent Application No. 201910364346.2, filed on Apr. 30, 2019. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a vibration board 121, a transducer 122, and a linking component 123. The transducer 122 may transduce electrical signals to mechanical vibrations. The vibration board 121 may be connected to the transducer 122 and vibrate synchronically with the transducer 122. The vibration board 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the vibration board 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including: providing a bone conduction speaker including a vibration board fitting human skin and passing vibrations, a transducer, and a housing, wherein at least one sound guiding hole is located in at least one portion of the housing; the transducer drives the vibration board to vibrate; the housing vibrates, along with the vibrations of the transducer, and pushes air, forming a leaked sound wave transmitted in the air; the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a vibration board and a transducer, wherein: the transducer is configured to generate vibrations and is located inside the housing; the vibration board is configured to be in contact with skin and pass vibrations; at least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 121, vibration board; 122, transducer; 123, linking component; 210, first frame; 220, second frame; 230, moving coil; 240, inner magnetic component; 250, outer magnetic component; 260; vibration board; 270, vibration unit; 10, housing; 11, sidewall; 12, bottom; 21, vibration board; 22, transducer; 23, linking component; 24, elastic component; 30, sound guiding hole; 1400, earphone; 1410, sound production component; 1420, ear hook; 1421, hook portion; 1422, connection portion; 13, master control circuit board; 100, ear; 103, cavum concha; 105, external ear canal; 107, helix; 111, housing; 112, sound outlet; 114, front cavity; 115, rear cavity; 1141, diaphragm; 1142, voice coil; 1143, cone holder; 1144, magnetic circuit assembly; 11441, magnetic conduction plate; 11442, magnet; 11443, accommodation member.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
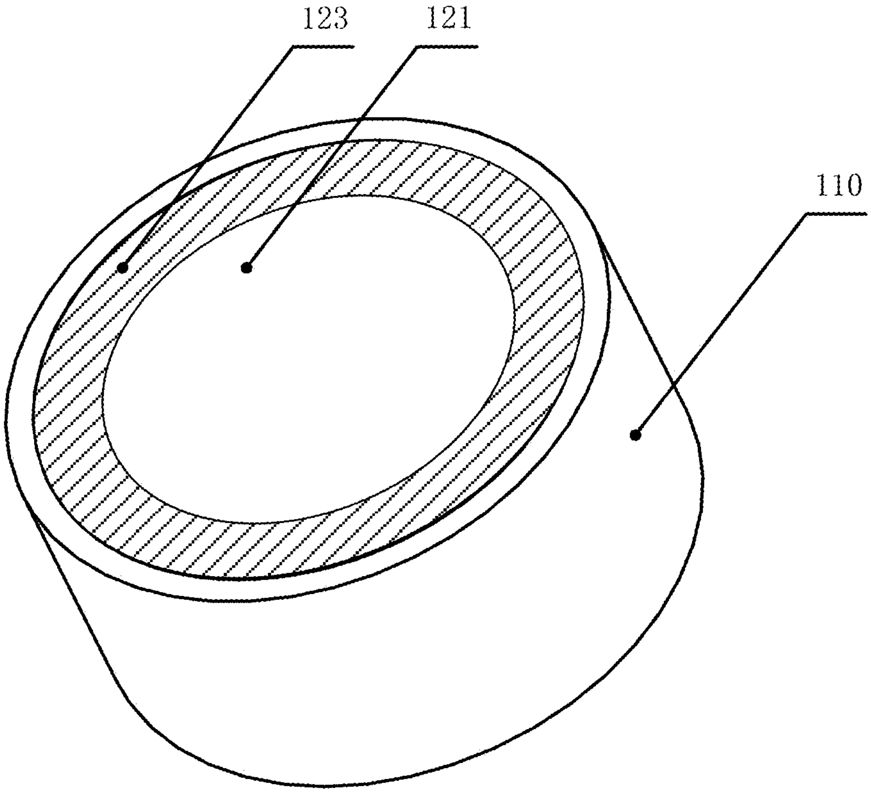
FIGS. 1A and 1B are schematic structures illustrating a bone conduction speaker of prior art.
Figure 1B:
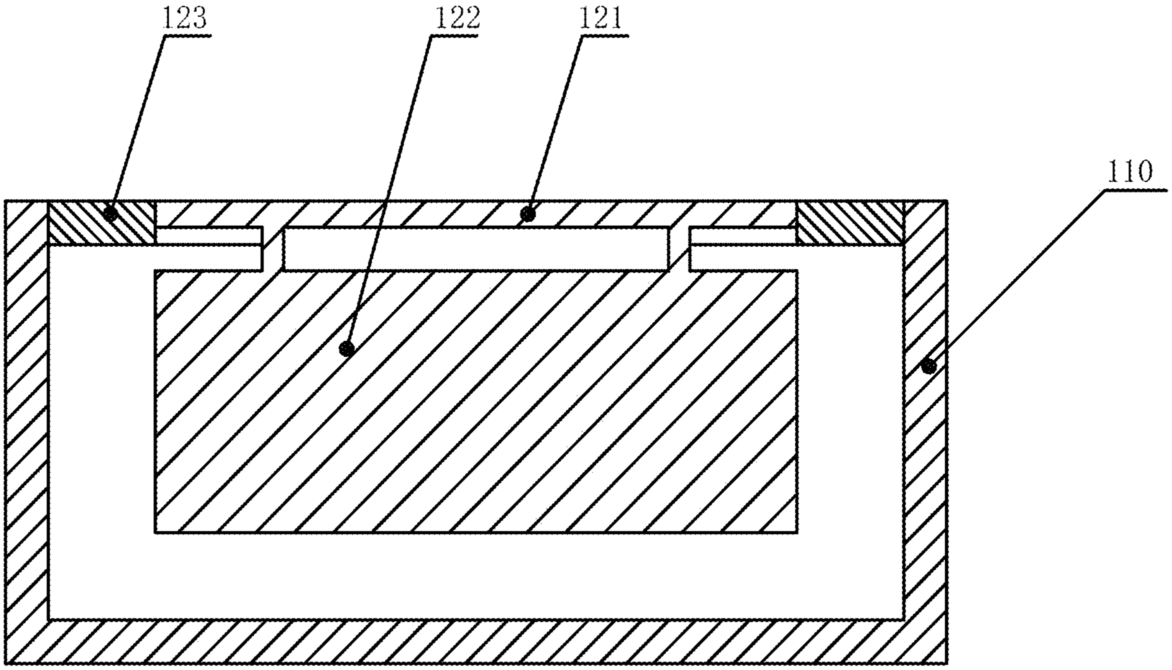
Figure 2:
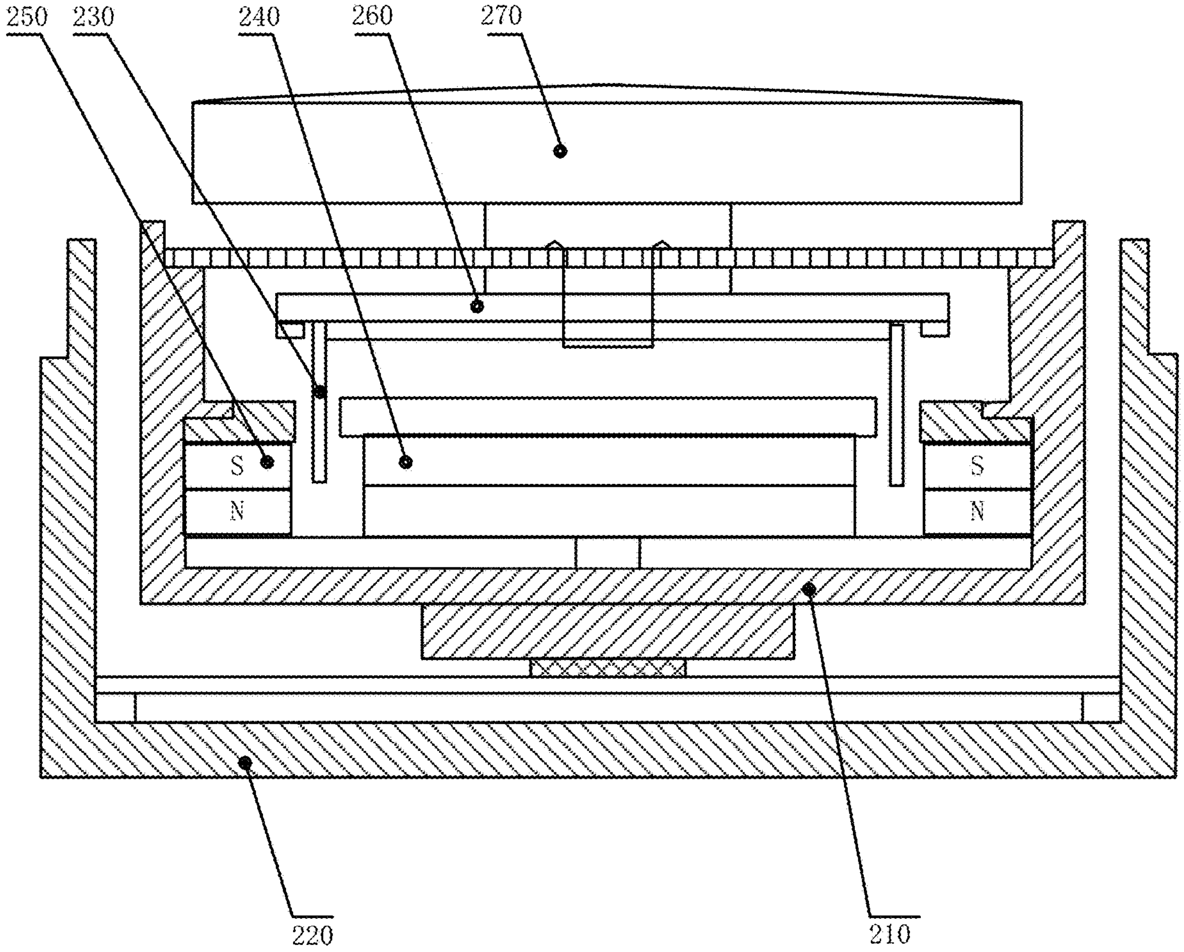
FIG. 2 is a schematic structure illustrating another bone conduction speaker of prior art.
Figure 3:
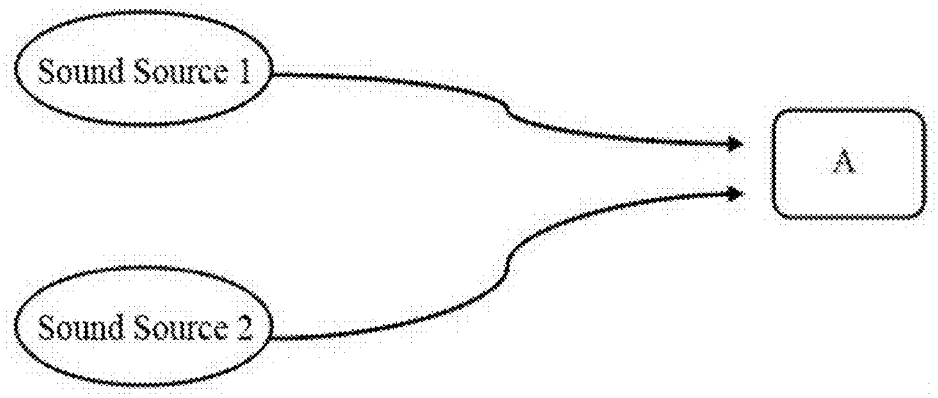
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage. This disclosure also applies above-noted principles of sound wave interference to an air conduction speaker and discloses an air conduction speaker that can reduce sound leakage and/or an earphone including the air conduction speaker.

Embodiment One

Figure 4A:
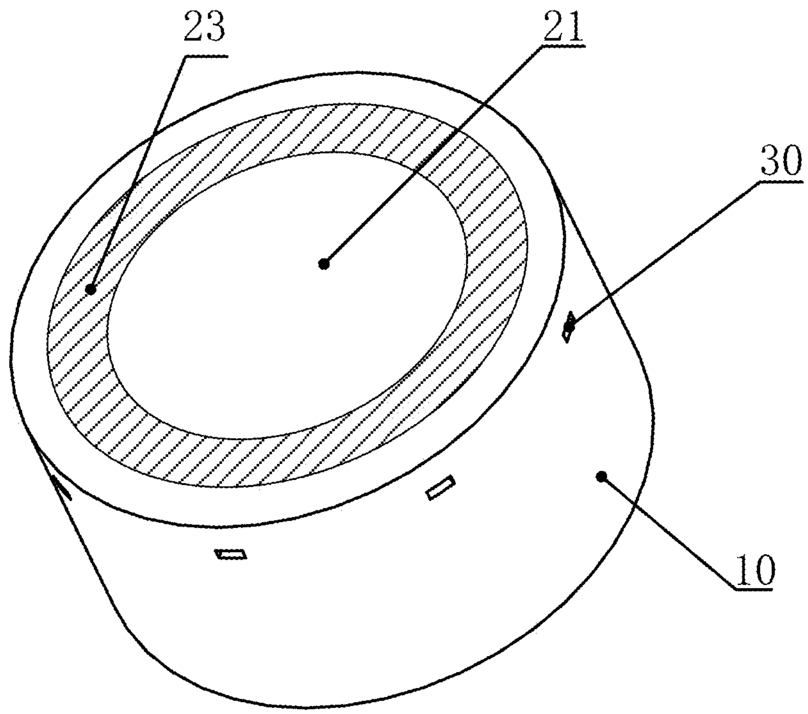
FIGS. 4A and 4B are schematic structures of an exemplary bone conduction speaker according to some embodiments of the present disclosure.
Figure 4B:
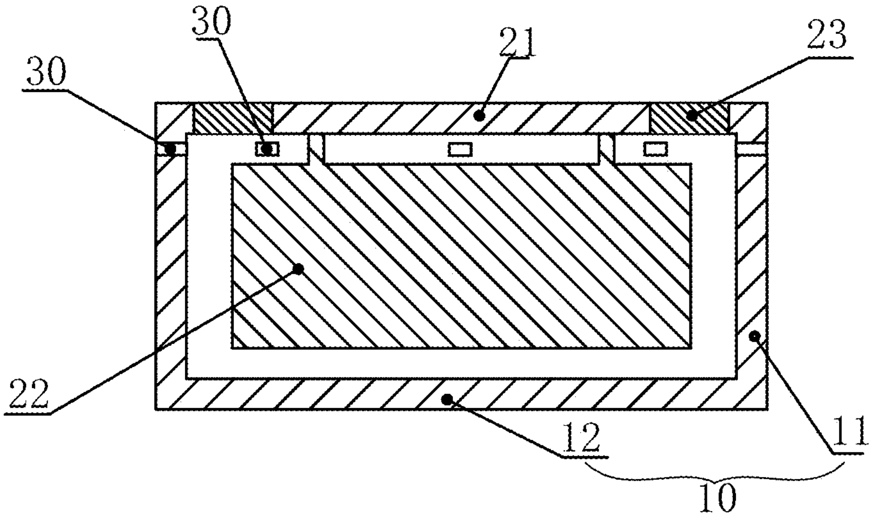

FIGS. 4A and 4B are schematic structures of an exemplary bone conduction speaker. The bone conduction speaker may include a housing 10, a vibration board 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reduce the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the vibration board 21 may be connected to the transducer 22 and configured to vibrate along with the transducer 22. The vibration board 21 may stretch out from the opening of the housing 10, and touch the skin of the user and pass vibrations to auditory nerves through human tissues and bones, which in turn enables the user to hear sound. The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the vibration board 21 to vibrate. The transducer 22, which resides inside the housing 10, may vibrate. The vibrations of the transducer 22 may drives the air inside the housing 10 to vibrate, producing a sound wave inside the housing 10, which can be referred to as "sound wave inside the housing." Since the vibration board 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the vibration board 21) to about the ⅓ height of the sidewall.

Figure 4C:
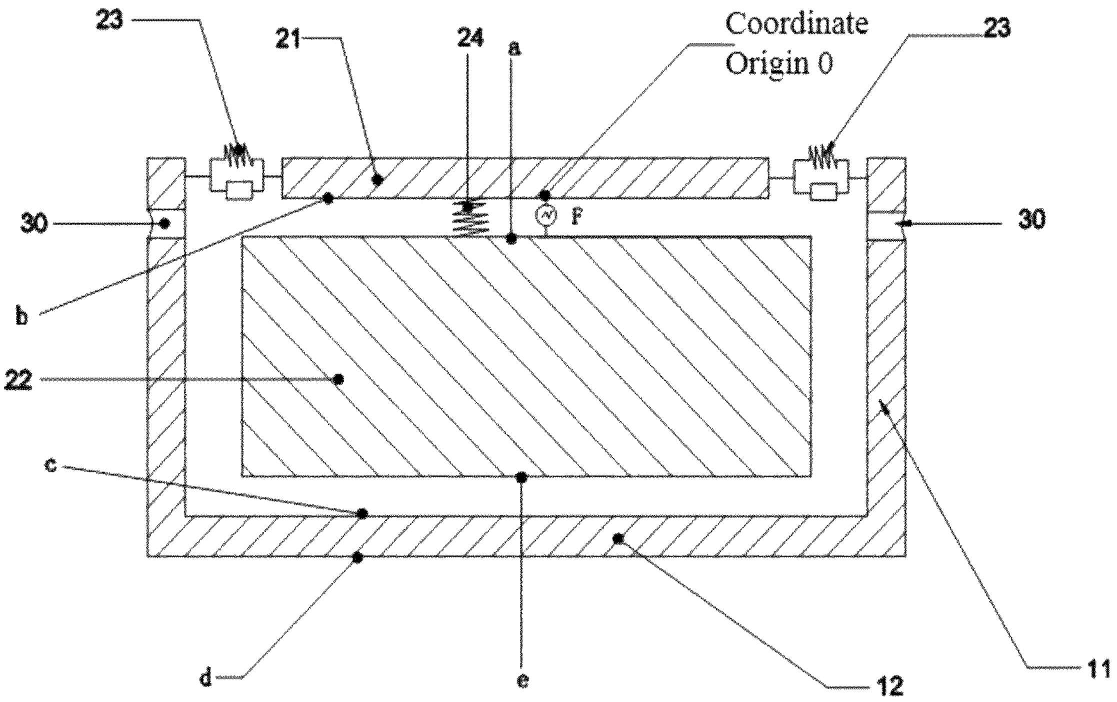
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the vibration board 21 may be represented by an elastic element 23 and a damping element in the parallel connection. The linking relationship between the vibration board 21 and the transducer 22 may be represented by an elastic element 24.

Outside the housing 10, the sound leakage reduction is proportional to $$(\iint_{S_{hole}} P ds - \iint_{S_{housing}} P_d ds), \tag{1}$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $$P = P_a + P_b + P_c + P_e, \tag{2}$$

wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the vibration board 21, side b refers to the lower surface of the vibration board 21 that is close to the transducer 22, side c refers to the inner upper surface of the bottom 12 that is close to the transducer 22, and side e refers to the lower surface of the transducer 22 that is close to the bottom 12.

The center of the side b, 0 point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \iint_{S_a} W_a(x_a', y_a') \cdot \frac{e^{jkR(x_a', y_a')}}{4\pi R(x_a', y_a')} dx_a' dy_a' - P_{aR}, \tag{3}$$

$$P_b(x, y, z) = -j\omega\rho_0 \iint_{S_b} W_b(x', y') \cdot \frac{e^{jkR(x', y')}}{4\pi R(x', y')} dx' dy' - P_{bR}, \tag{4}$$

$$P_c(x, y, z) = -j\omega\rho_0 \iint_{S_c} W_c(x_c', y_c') \cdot \frac{e^{jkR(x_c', y_c')}}{4\pi R(x_c', y_c')} dx_c' dy_c' - P_{cR}, \tag{5}$$

$$P_e(x, y, z) = -j\omega\rho_0 \iint_{S_e} W_c(x_e', y_e') \cdot \frac{e^{jkR(x_e', y_e')}}{4\pi R(x_e', y_e')} dx_e' dy_e' - P_{eR}, \tag{6}$$

wherein $R(x',y')=\sqrt{(x-x')^2+(y-y')^2+z^2}$ is the distance between an observation point (x, y, z) and a point on side b (x', y', 0); $S_a$, $S_b$, $S_c$ and $S_e$ are the areas of side a, side b, side c and side e, respectively;

$R(x_a',y_a')=\sqrt{(x-x_a')^2+(y-y_a')^2+(z-z_a)^2}$ is the distance between the observation point (x, y, z) and a point on side a $(x_a',y_a',z_a)$;

$R(x_c',y_c')=\sqrt{(x-x_c')^2+(y-y_c')^2+(z-z_c)^2}$ is the distance between the observation point (x, y, z) and a point on side c $(x_c',y_c',z_c)$;

$R(x_e',y_e')=\sqrt{(x-x_e')^2+(y-y_e')^2+(z-z_e)^2}$ is the distance between the observation point (x, y, z) and a point on side e $(x_e',y_e',z_e)$;

$k=\omega/u$ (u is the velocity of sound) is wave number, $\rho_0$ is an air density, $\omega$ is an angular frequency of vibration.

$P_{aR}$, $P_{bR}$, $P_{cR}$ and $P_{eR}$ are acoustic resistances of air, which respectively are:

$$P_{aR} = A \cdot \frac{z_a \cdot r + j\omega \cdot z_a \cdot r'}{\varphi} + \delta, \tag{7}$$

-continued $$P_{bR} = A \cdot \frac{z_b \cdot r + j\omega \cdot z_b \cdot r'}{\varphi} + \delta, \quad (8)$$

$$P_{cR} = A \cdot \frac{z_c \cdot r + j\omega \cdot z_c \cdot r'}{\varphi} + \delta, \quad (9)$$

$$P_{eR} = A \cdot \frac{z_e \cdot r + j\omega \cdot z_e \cdot r'}{\varphi} + \delta, \quad (10)$$

wherein r is the acoustic resistance per unit length, r' is the sound quality per unit length, $z_a$ is the distance between the observation point and side a, $z_b$ is the distance between the observation point and side b, $z_c$ is the distance between the observation point and side c, z, is the distance between the observation point and side e.

$W_a(x,y)$, $W_b(x,y)$, $W_c(x,y)$, $W_e(x,y)$ and $W_d(x,y)$ are the sound source power per unit area of side a, side b, side c, side e and side d, respectively, which can be derived from following formulas (11):

$$F_e=F_a=F-k_1 \cos \omega t-\iint_{S_a} W_a(x,y)dxdy-\iint_{S_e} W_e(x,y)dxdy-f$$

$$F_b=-F+k_1 \cos \omega t+\iint_{S_b} W_b(x,y)dxdy-\iint_{S_e} W_e(x,y)dxdy-L$$

$$F_c=F_d=F_b-k_2 \cos \omega t-\iint_{S_c} W_c(x,y)dxdy-f-\gamma$$

$$F_d=F_b-k_2 \cos \omega t-\iint_{S_d} W_d(x,y)dxdy \quad (11)$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 12. $S_d$ is the region of side d, f is the viscous resistance formed in the small gap of the sidewalls, and $f=\eta\Delta s(dv/dy)$.

L is the equivalent load on human face when the vibration board acts on the human face, $\gamma$ is the energy dissipated on elastic element 24, $k_1$ and $k_2$ are the elastic coefficients of elastic element 23 and elastic element 24 respectively, $\eta$ is the fluid viscosity coefficient, dv/dy is the velocity gradient of fluid, $\Delta s$ is the cross-section area of a subject (board), A is the amplitude, $\varphi$ is the region of the sound field, and $\delta$ is a high order minimum (which is generated by the incompletely symmetrical shape of the housing).

The sound pressure of an arbitrary point outside the housing, generated by the vibration of the housing 10 is expressed as:

$$P_d = -j\omega\rho_0 \int\int W_d(x'_d, y'_d) \cdot \frac{e^{jkR(x'_d, y'_d)}}{4\pi R(x'_d, y'_d)} dx'_d dy'_d, \quad (12)$$

wherein $R(x_d', y_d')=\sqrt{(x-x_d')^2+(y-y_d')^2+(z-z_d)^2}$ is the distance between the observation point (x, y, z) and a point on side d ($x_d'$, $y_d'$, $z_d$).

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}}$ Pds.

In the meanwhile, because the vibration board 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing 10 may be expressed as $\iint_{S_{housing}} P_d$ds.

The leaked sound wave and the guided sound wave interference may result in a weakened sound wave, i.e., to make $\iint_{S_{hole}}$ Pds and $\iint_{S_{housing}} P_d$ds have the same value but opposite directions, and the sound leakage may be reduced. In some embodiments, $\iint_{S_{hold}}$ Pds may be adjusted to reduce the sound leakage. Since $\iint_{S_{hole}}$ Pds corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
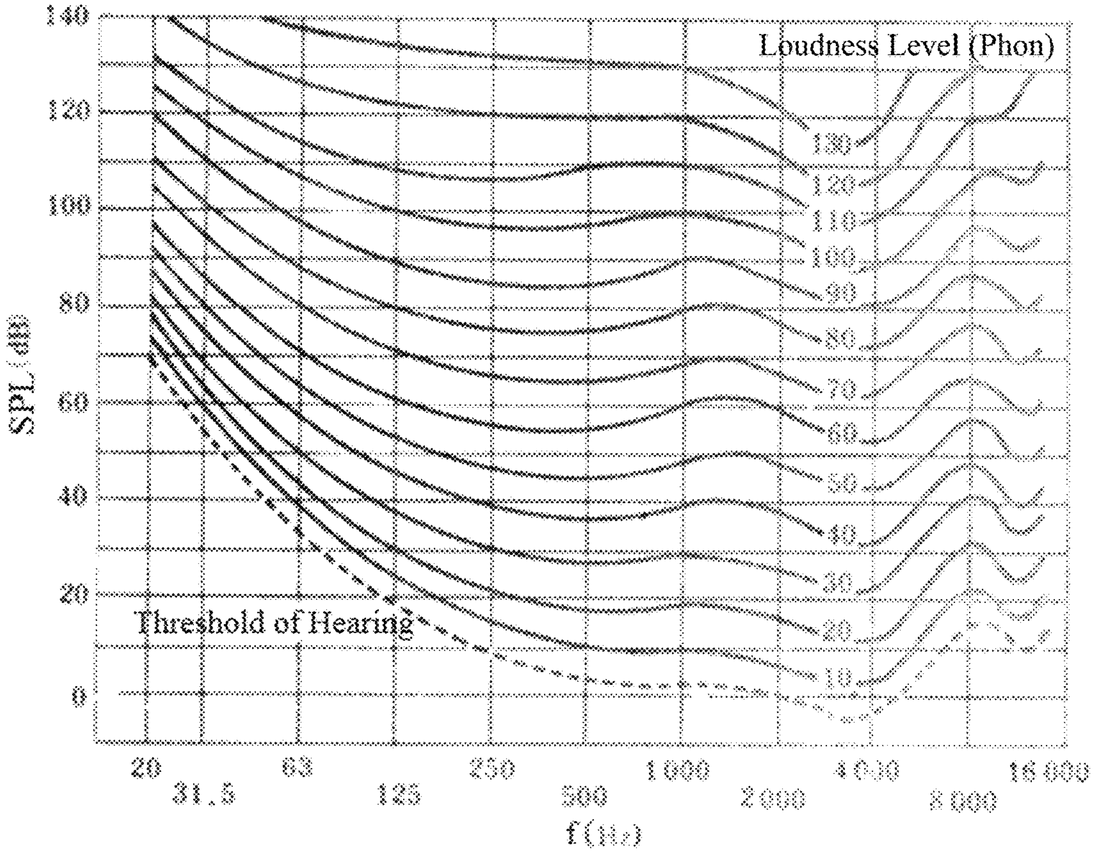
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
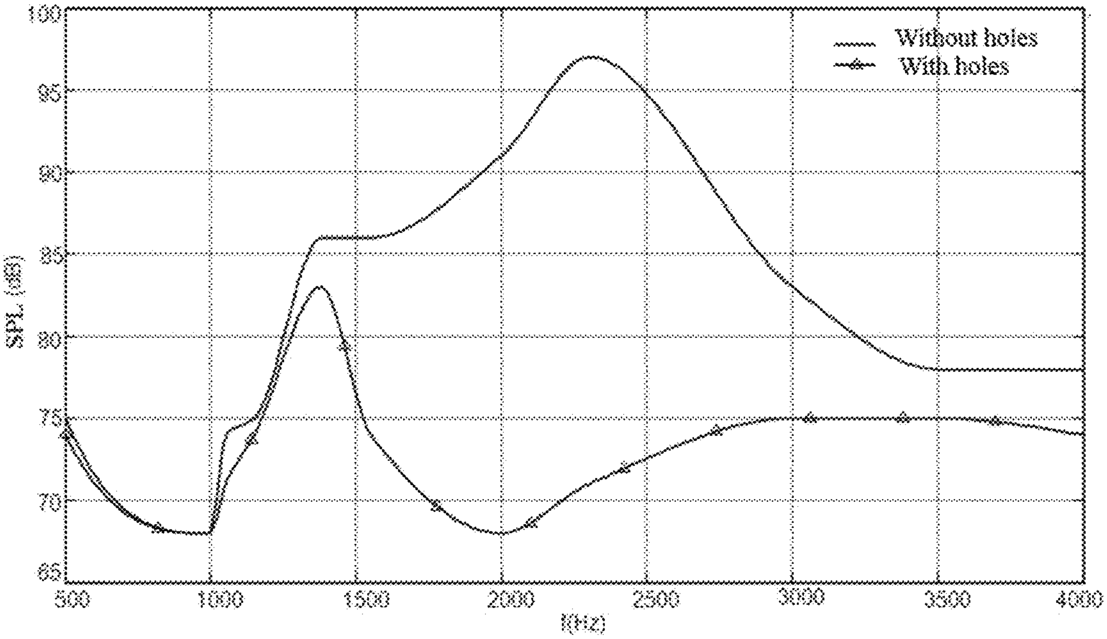
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz~3000 Hz, the sound leakage is reduced by over 10 dB. In the frequency range of 2000 Hz~2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 10. The portion of the housing may be the sidewall 11 of the housing 10 and/or the bottom 12 of the housing 10. Merely by way of example, the leaked sound wave may be generated by the bottom 12 of the housing 10. The guided sound wave output through the sound guiding hole(s) 30 may interfere with the leaked sound wave generated by the portion of the housing 10. The interference may enhance or reduce a sound pressure level of the guided sound wave and/or leaked sound wave in the target region.

In some embodiments, the portion of the housing 10 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 10 is small, the sound guiding hole may be approximately regarded as a point sound source. In some embodiments, any number or count of sound guiding holes provided on the housing 10 for outputting sound may be approximated as a single point sound source. Similarly, for simplicity, the portion of the housing 10 that generates the leaked sound wave may also be approximately regarded as a point sound source. In some embodiments, both the first sound source and the second sound source may approximately be regarded as point sound sources (also referred to as two-point sound sources).

Figure 4E:
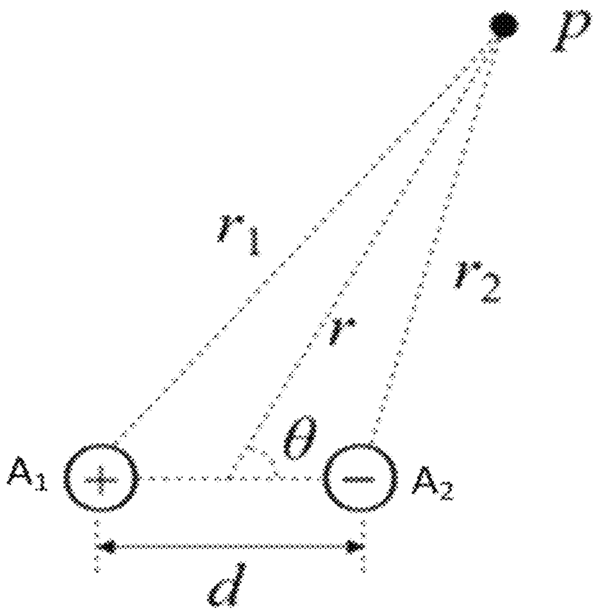
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure p generated by a single point sound source may satisfy Equation (13):

$$p = \frac{j \cdot \rho_0}{4\pi r} Q_0 \exp j(\omega t - kr), \tag{13}$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 10 that generates the leaked sound wave is large (e.g., the portion of the housing 10 is a vibration surface or a sound radiation surface), the portion of the housing 10 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 10. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources.

Merely by way of example, the air conduction speaker may include a diaphragm disposed in a cavity formed by a housing of the air conduction speaker. The diaphragm may divide the housing to form a front cavity and a rear cavity. The housing may include a sound outlet (e.g., the sound outlet 112 in FIG. 14) configured to transmit a sound wave generated in the front cavity to the human ear. However, when the air conduction speaker is placed at a position near an ear canal but not blocking the ear canal, the sound wave transmitted by the sound outlet may form a leaked sound wave in the far-field (or a target region). In some embodiments, in order to reduce the amplitude of the leaked sound wave and thus reduce the sound leakage, the housing may further include a pressure relief hole (e.g., the pressure relief hole 113 in FIG. 14) configured to guide a sound wave generated in the rear cavity out of the housing. The sound outlet and the at least one pressure relief hole, also referred to as sound guiding holes of the air conduction speaker, may be treated as the two-point sound sources. The guided sound wave transmitted by the pressure relief hole may form interference with the leaked sound wave generated by the sound outlet in the far-field, so as to reduce the amplitude of the leaked sound, thereby ensuring the sound leakage reduction effect. More descriptions about the sound waves transmitted through the sound outlet 112 and the pressure relief hole 113 may be found elsewhere of the present disclosure, e.g., FIG. 14 and the descriptions thereof.

It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 10 and the sound guiding hole(s) are opposite, that is, an absolute value of the phase difference between the two-point sound sources is 180 degrees, the far-field leakage may be reduced according to the principle of reversed phase cancellation.

In some embodiments, a size (e.g., an area, a depth), a position, etc. of at least one of the two-point sound sources may be adjusted to achieve better sound leakage reduction and/or improve the sound intensity at the ear canal. In some embodiments, the acoustic output device (e.g., the air conduction speaker) may be worn by the user through a suspension structure (e.g., an ear hook 1420 illustrated in FIG. 14). For example, the acoustic output device may be implemented as an earphone including the suspension structure. In some embodiments, the earphone may be configured such that when the earphone is in a wearing state, the sound guiding holes (or the two-point sound sources) meet certain conditions, and the earphone may output different sound effects in the near field and the far field. For example, a connection line of the two-point sound sources may be directed to an ear canal (or a hearing position) of the user such that the user can hear a sufficiently loud sound. As another example, the earphone may be configured such that when the earphone is in a wearing state, at least a portion (e.g., an inner side surface IS of the housing 10) of the earphone and the human ear (e.g., the cavum concha 103 illustrated in FIG. 14) may form a cavity structure, one of the sound guiding holes (e.g., the sound outlet) may be in the cavity structure, and another one of the sound guiding holes (e.g., the at least one sound relief hole) may be outside the cavity structure, which may increase listening volume at the listening position and maintain a comparable sound leakage reduction effect. More description regarding the sound guiding holes (e.g., the sound outlet and/or the at least one pressure relief hole) and/or the earphone may be found elsewhere in the present disclosure. See, e.g., FIGS. 14-18B and relevant descriptions thereof.

In some embodiments, the interference between the guided sound wave and the leaked sound wave at a specific frequency may relate to a distance between the sound guiding hole(s) and the portion of the housing 10. For example, if the sound guiding hole(s) are set at the upper portion of the sidewall of the housing 10 (as illustrated in FIG. 4A), the distance between the sound guiding hole(s) and the portion of the housing 10 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
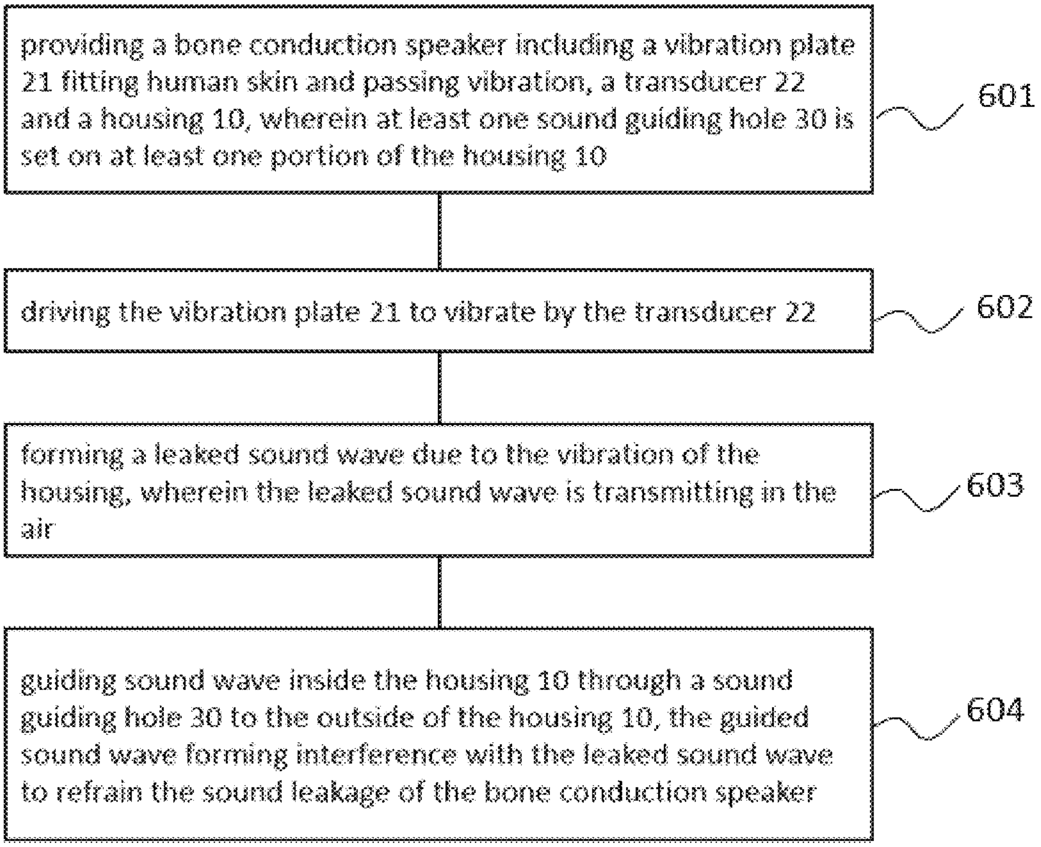
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a vibration plate 21 touching human skin and passing vibrations, a transducer 22, and a housing 10 is provided. At least one sound guiding hole 30 is arranged on the housing 10. At 602, the vibration plate 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
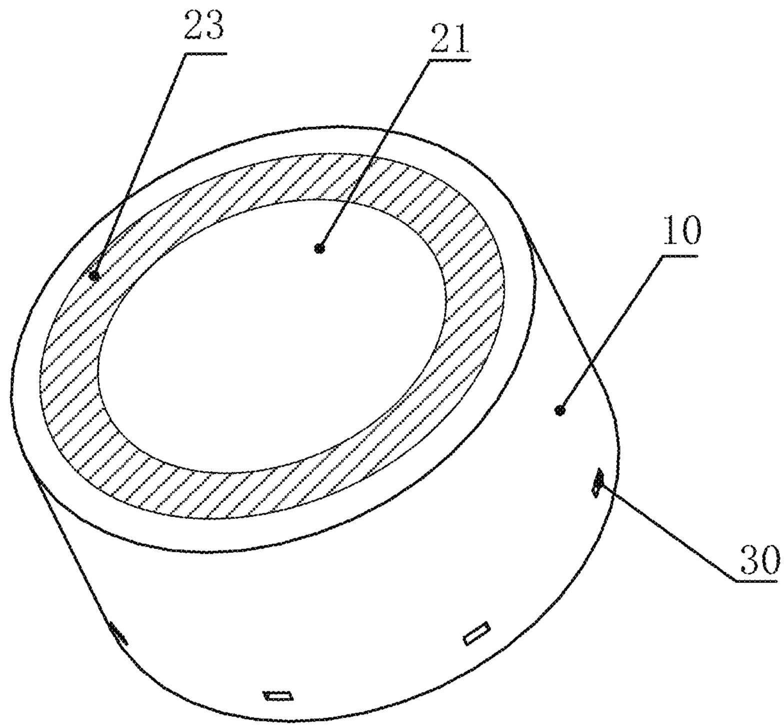
FIGS. 7A and 7B are schematic structures of an exemplary bone conduction speaker according to some embodiments of the present disclosure.
Figure 7B:
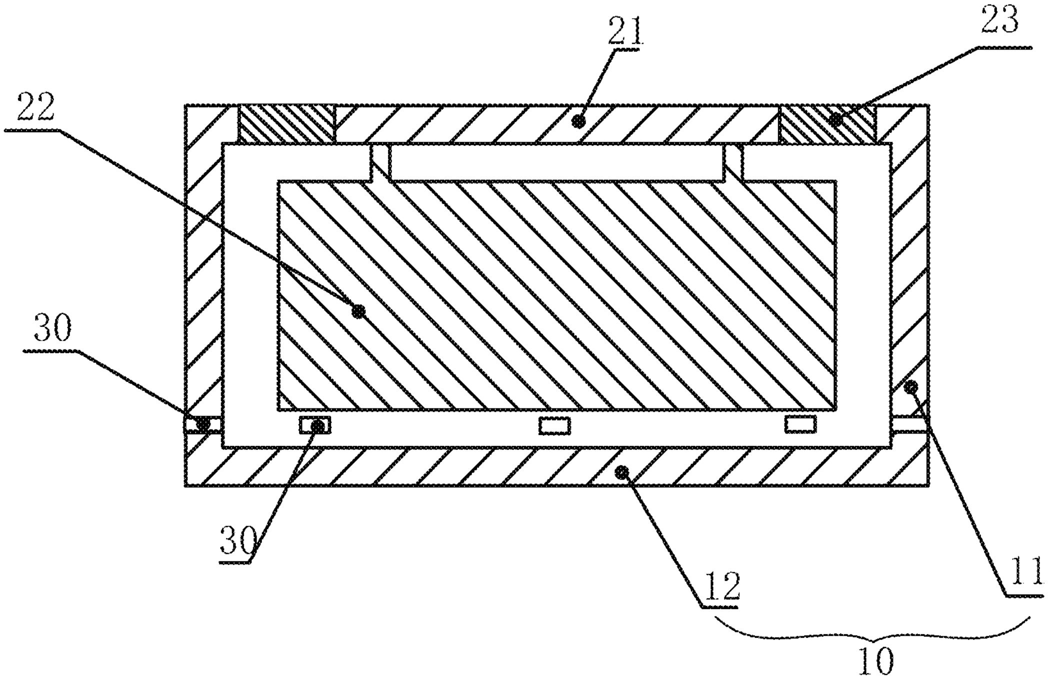

FIGS. 7A and 7B are schematic structures illustrating an exemplary bone conduction speaker according to some embodiments of the present disclosure. The bone conduction speaker may include an open housing 10, a vibration board 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer may include components such as magnetizer, voice coil, and etc., and the components may locate inside the housing and may generate synchronous vibrations with a same frequency.

Figure 7C:
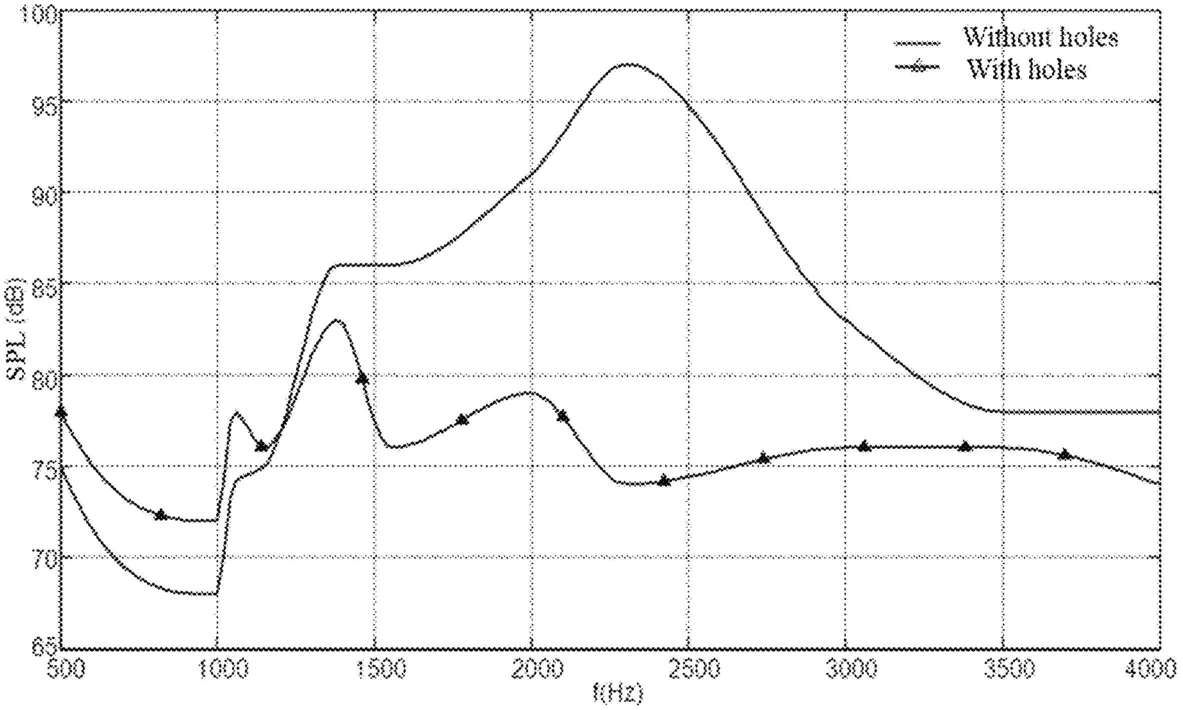
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz~4000 Hz, the sound leakage is reduced by more than 5 dB, and in the frequency range of 2250 Hz~2500 Hz, the sound leakage is reduced by more than 20 dB.

In some embodiments, the sound guiding hole(s) at the lower portion of the sidewall of the housing 10 may also be approximately regarded as a point sound source. In some embodiments, the sound guiding hole(s) at the lower portion of the sidewall of the housing 10 and the portion of the housing 10 that generates the leaked sound wave may constitute two-point sound sources. The two-point sound sources may be formed such that the guided sound wave output from the sound guiding hole(s) at the lower portion of the sidewall of the housing 10 may interfere with the leaked sound wave generated by the portion of the housing 10. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 10. For example, if the sound guiding hole(s) are set at the lower portion of the sidewall of the housing 10 (as illustrated in FIG. 7A), the distance between the sound guiding hole(s) and the portion of the housing 10 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
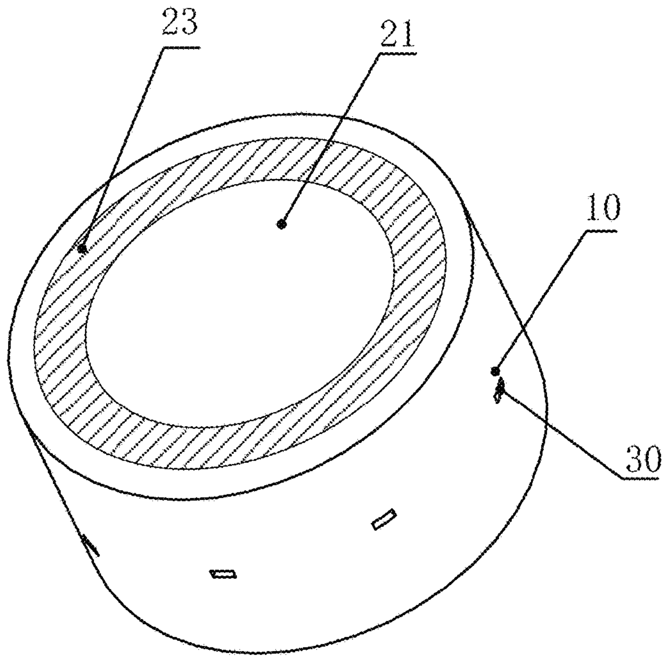
FIGS. 8A and 8B are schematic structure of an exemplary bone conduction speaker according to some embodiments of the present disclosure.
Figure 8B:
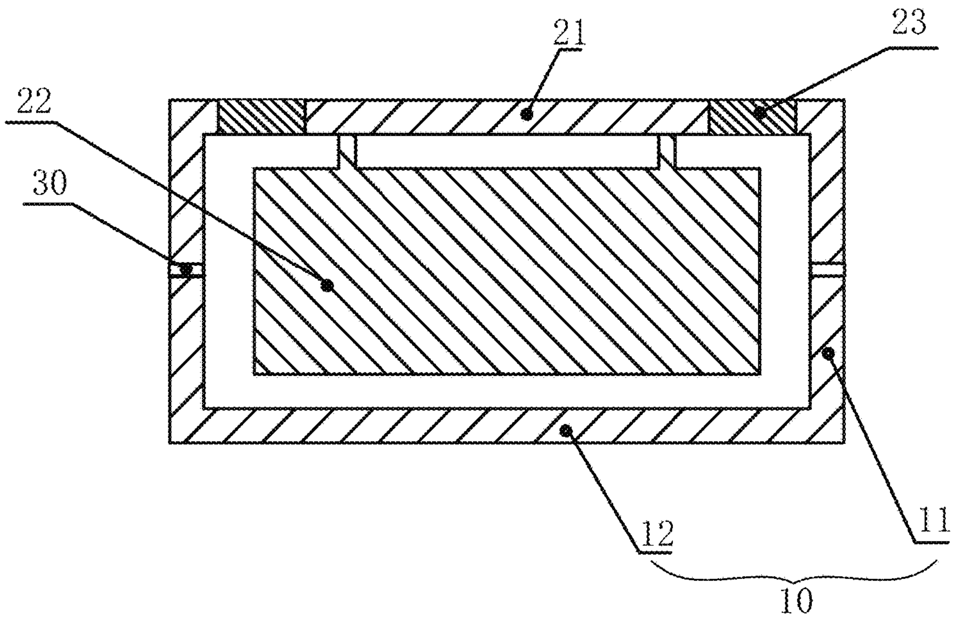

FIGS. 8A and 8B are schematic structures illustrating an exemplary bone conduction speaker according to some embodiments of the present disclosure. The bone conduction speaker may include an open housing 10, a vibration board 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
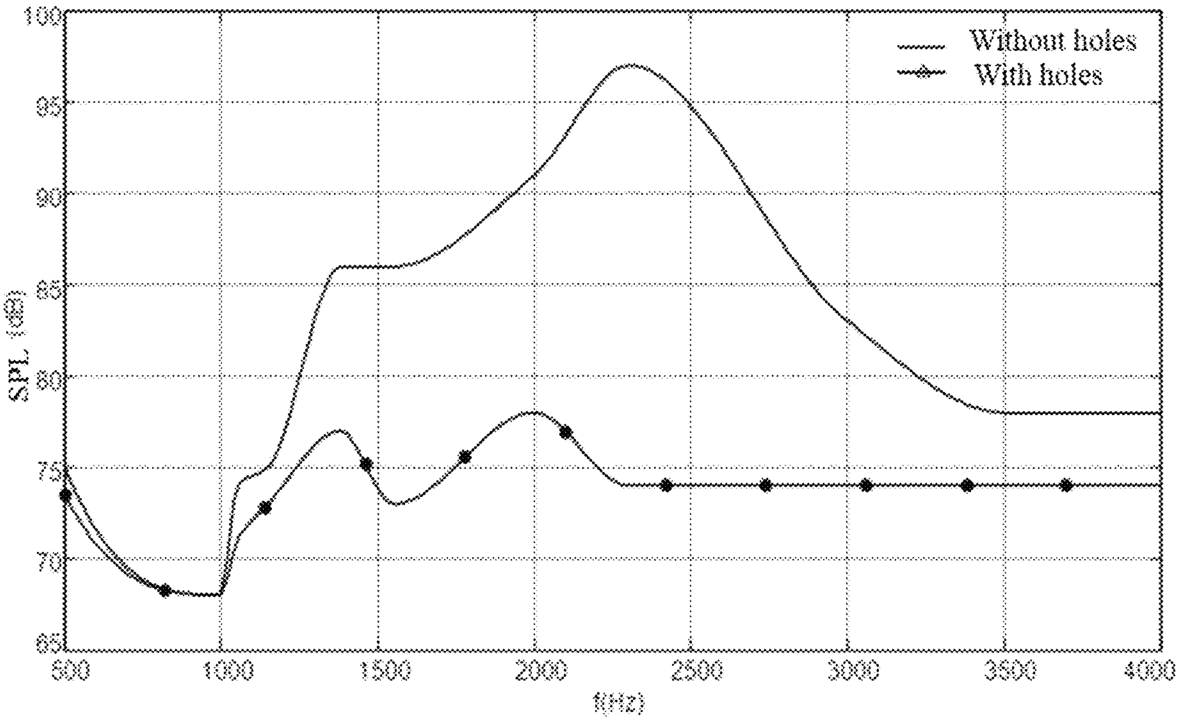
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
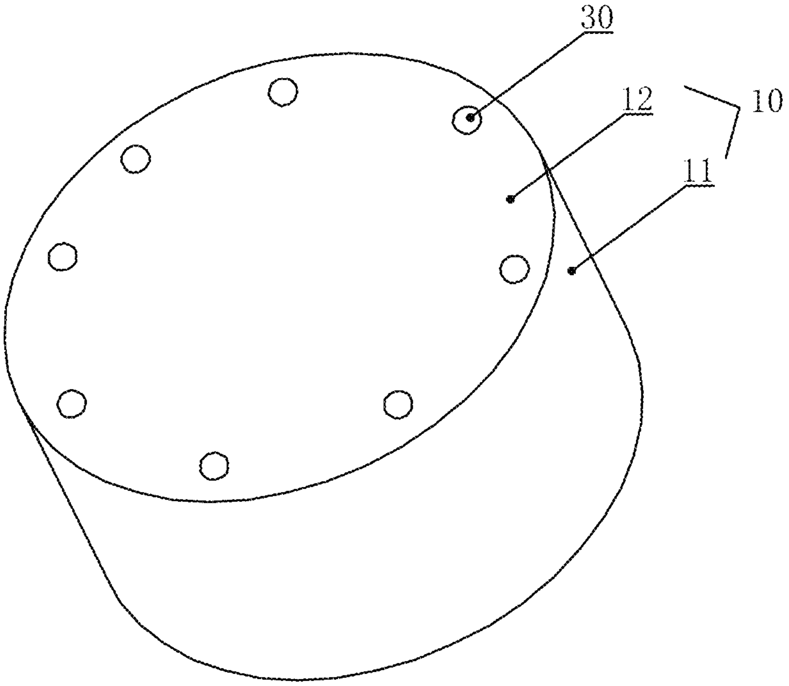
FIGS. 9A and 9B are schematic structures of an exemplary bone conduction speaker according to some embodiments of the present disclosure.
Figure 9B:
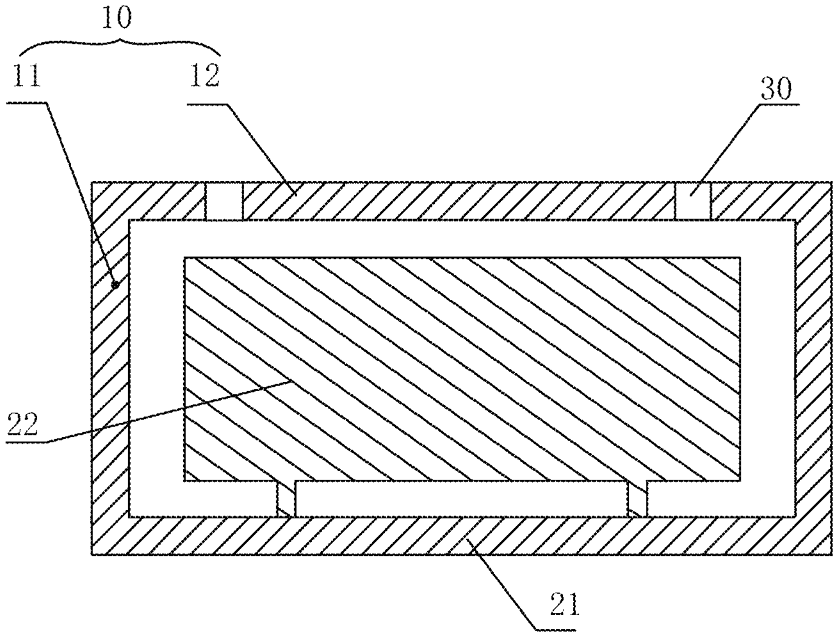

FIGS. 9A and 9B are schematic structures of an exemplary bone conduction speaker according to some embodiments of the present disclosure. The bone conduction speaker may include an open housing 10, a vibration board 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly or unevenly in one or more circles on the bottom of the housing 10. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
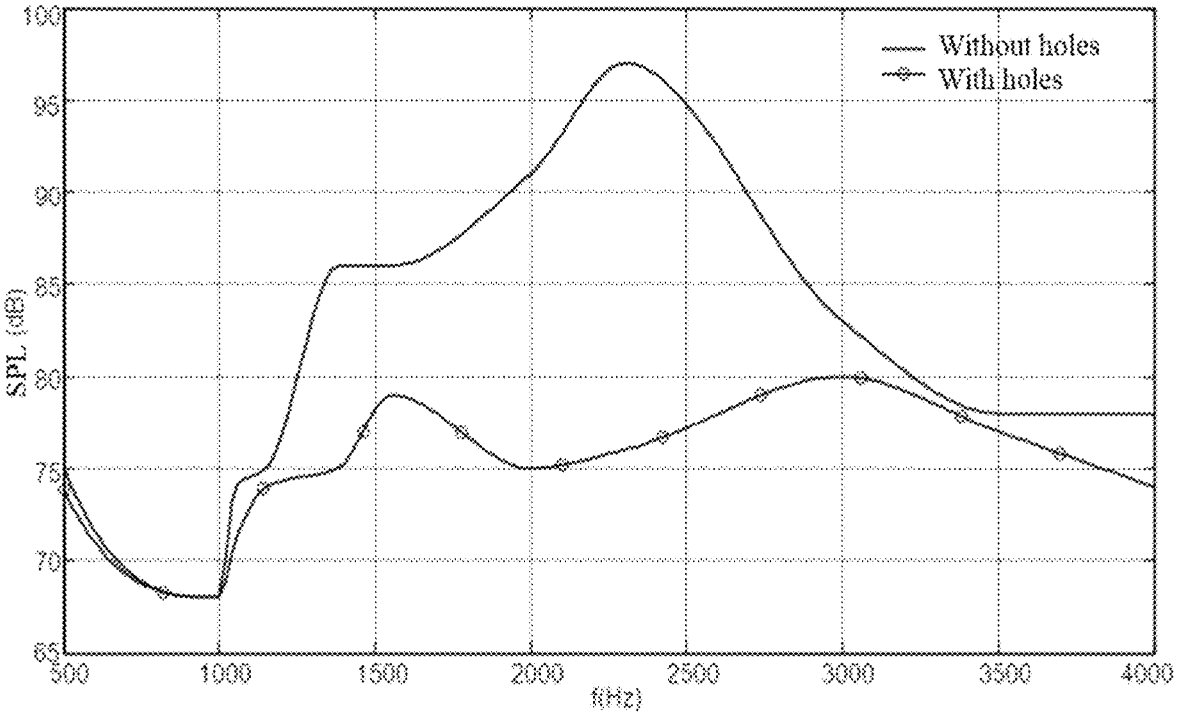
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz~3000 Hz, the effectiveness of reducing sound leakage is outstanding. For example, in the frequency range of 1700 Hz~2700 Hz, the sound leakage is reduced by more than 10 dB; in the frequency range of 2200 Hz~2400 Hz, the sound leakage is reduced by more than 20 dB.

Embodiment Six

Figure 10A:
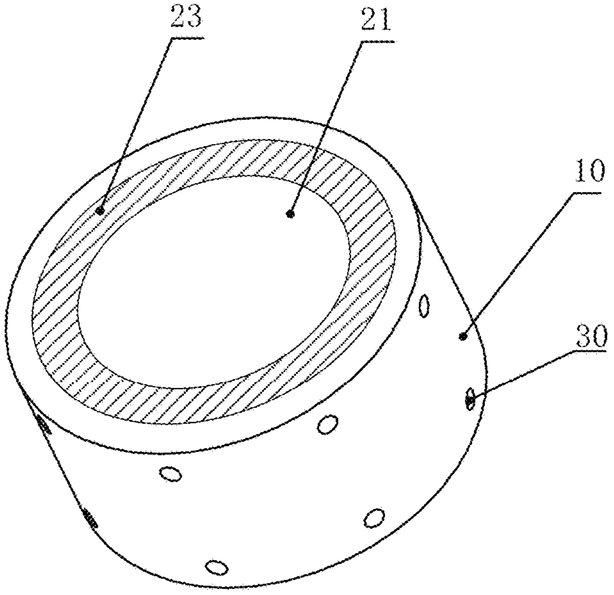
FIGS. 10A and 10B are schematic structures of an exemplary bone conduction speaker according to some embodiments of the present disclosure.
Figure 10B:
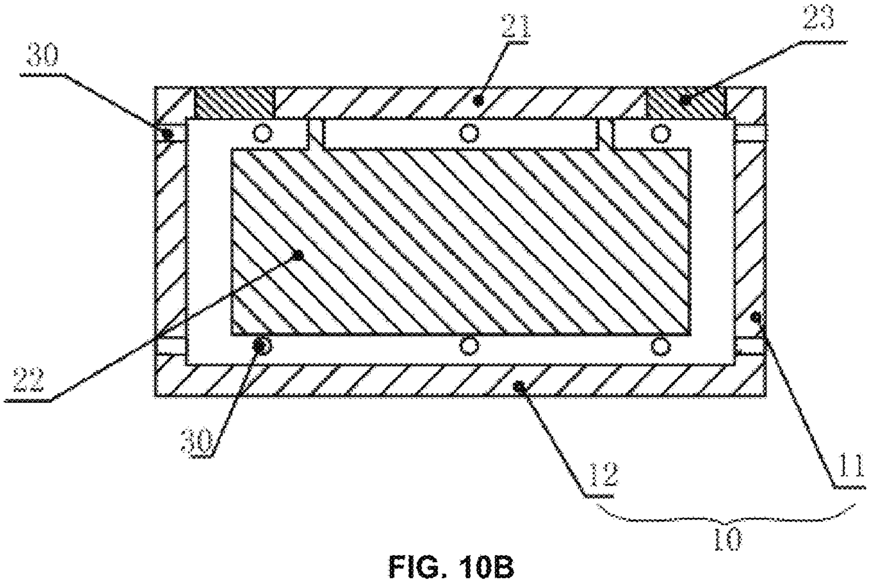

FIGS. 10A and 10B are schematic structures of an exemplary bone conduction speaker according to some embodiments of the present disclosure. The bone conduction speaker may include an open housing 10, a vibration board 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
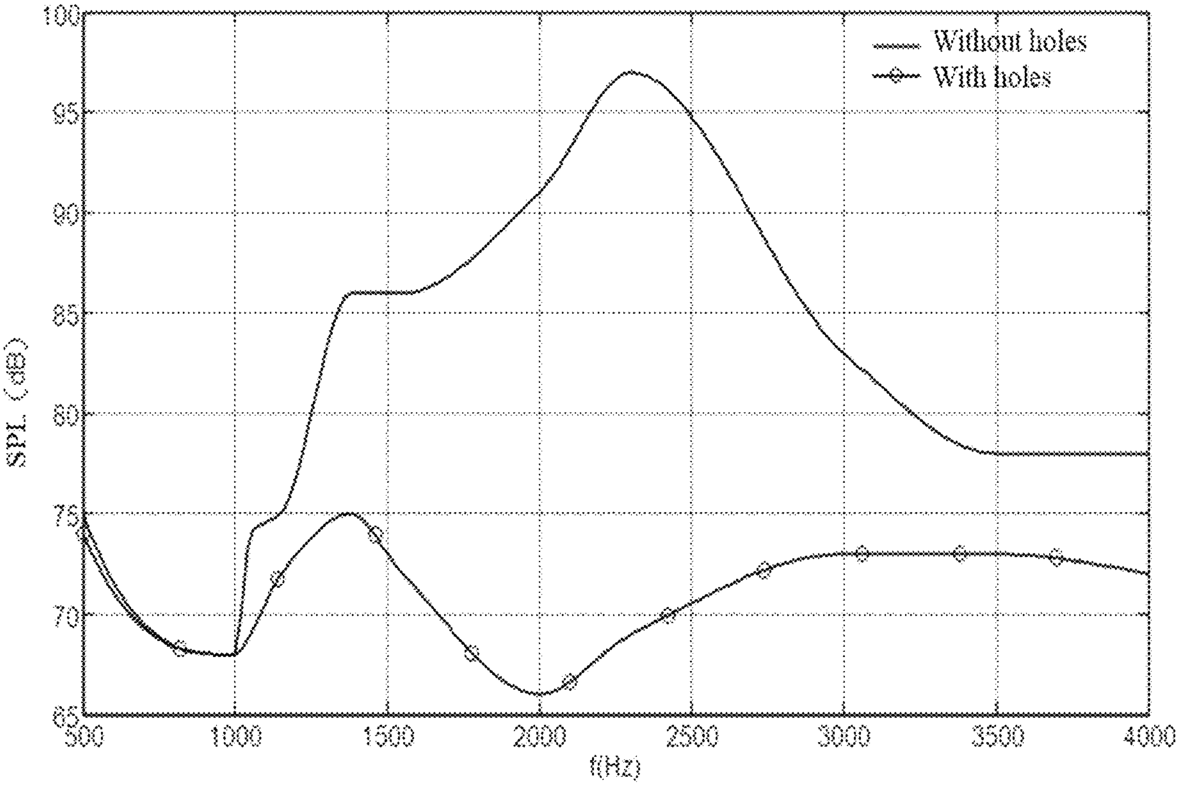
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 10 (also referred to as first hole(s)) may be approximately regarded as a point sound source. In some embodiments, the first hole(s) and the portion of the housing 10 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 10 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 10 (also referred to as second hole(s)) may also be approximately regarded as another point sound source. Similarly, the second hole(s) and the portion of the housing 10 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 10 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
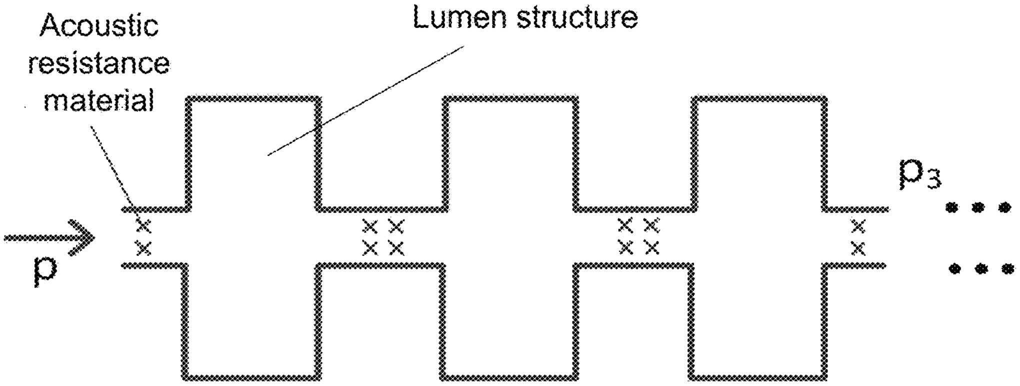
FIG. 10D is a schematic diagram illustrating an acoustic route according to some embodiments of the present disclosure.
Figure 10E:
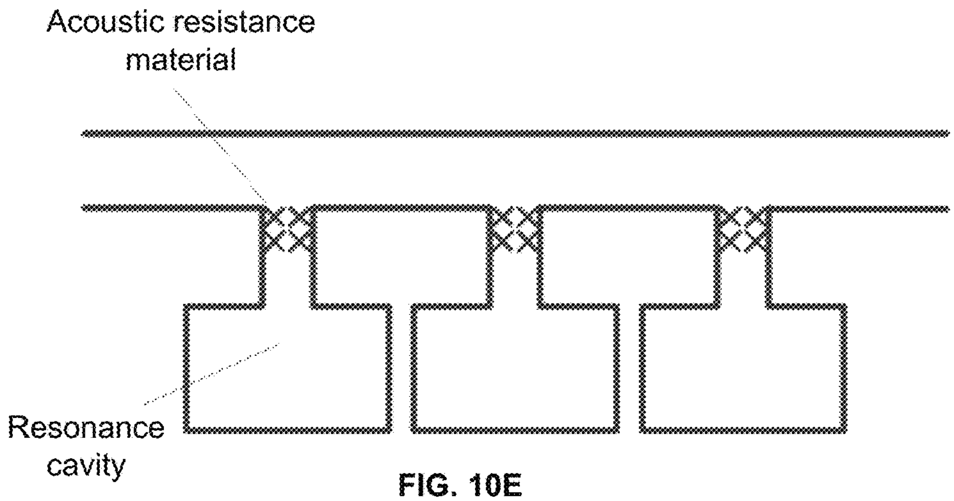
FIG. 10E is a schematic diagram illustrating another acoustic route according to some embodiments of the present disclosure.
Figure 10F:
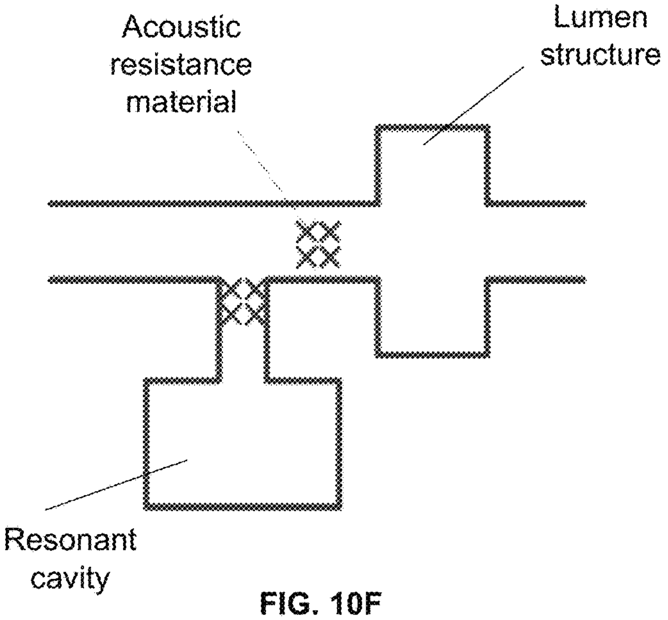
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5 MKS Rayleigh to 500 MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 10. In some embodiments, the portion of the housing that generates the leaked sound wave may be the bottom of the housing 10. The first hole(s) may have a larger distance to the portion of the housing 10 than the second hole(s). In some embodiments, the frequency of the first guided sound wave output from the first hole(s) (e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 10 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 10 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 10. For example, the leaked sound wave of the first frequency may be generated by the sidewall of the housing 10, the leaked sound wave of the second frequency may be generated by the bottom of the housing 10. As another example, the leaked sound wave of the first frequency may be generated by the bottom of the housing 10, the leaked sound wave of the second frequency may be generated by the sidewall of the housing 10. In some embodiments, the frequency of the leaked sound wave generated by the portion of the housing 10 may relate to parameters including the mass, the damping, the stiffness, etc., of the different portion of the housing 10, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 10, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
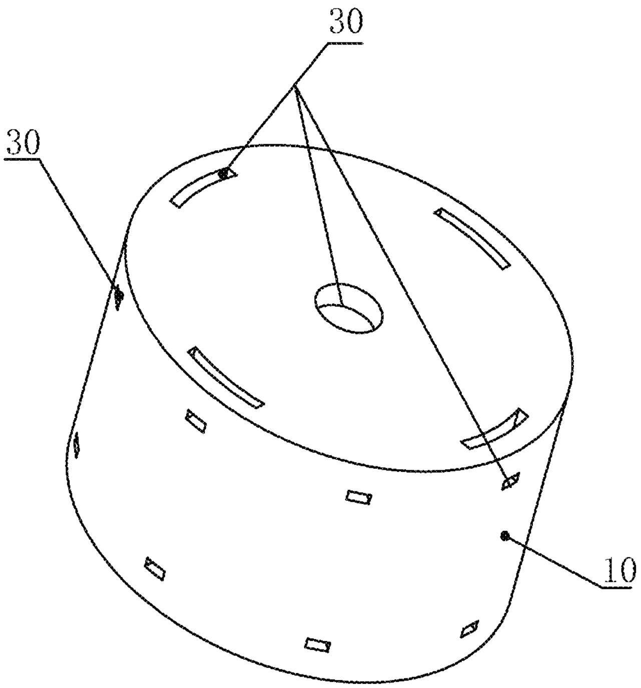
FIGS. 11A and 11B are schematic structures of an exemplary bone conduction speaker according to some embodiments of the present disclosure.
Figure 11B:
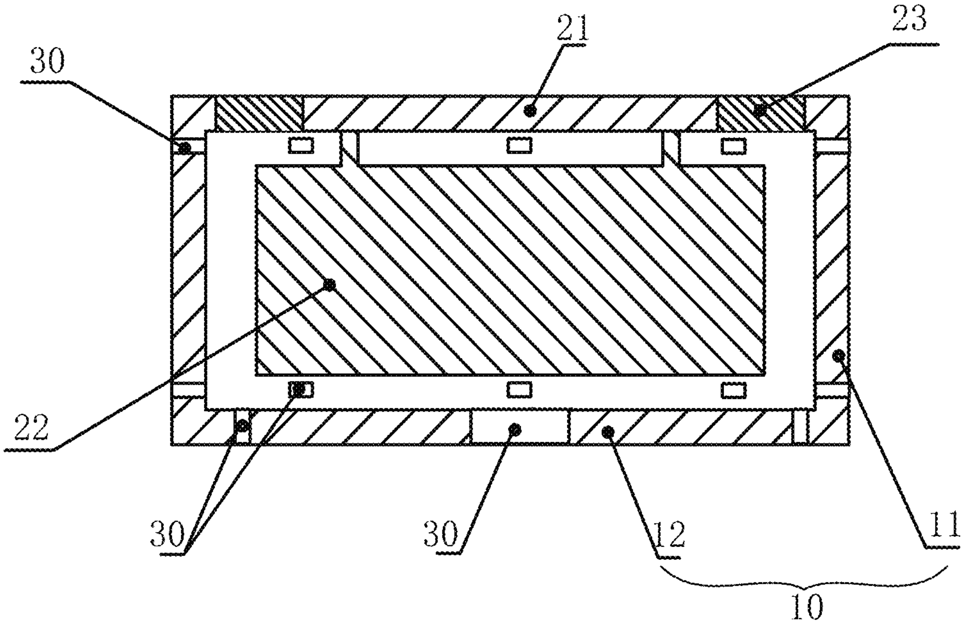

FIGS. 11A and 11B are schematic structures illustrating a bone conduction speaker according to some embodiments of the present disclosure. The bone conduction speaker may include an open housing 10, a vibration board 21 and a transducer 22. One or more perforative sound guiding holes may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
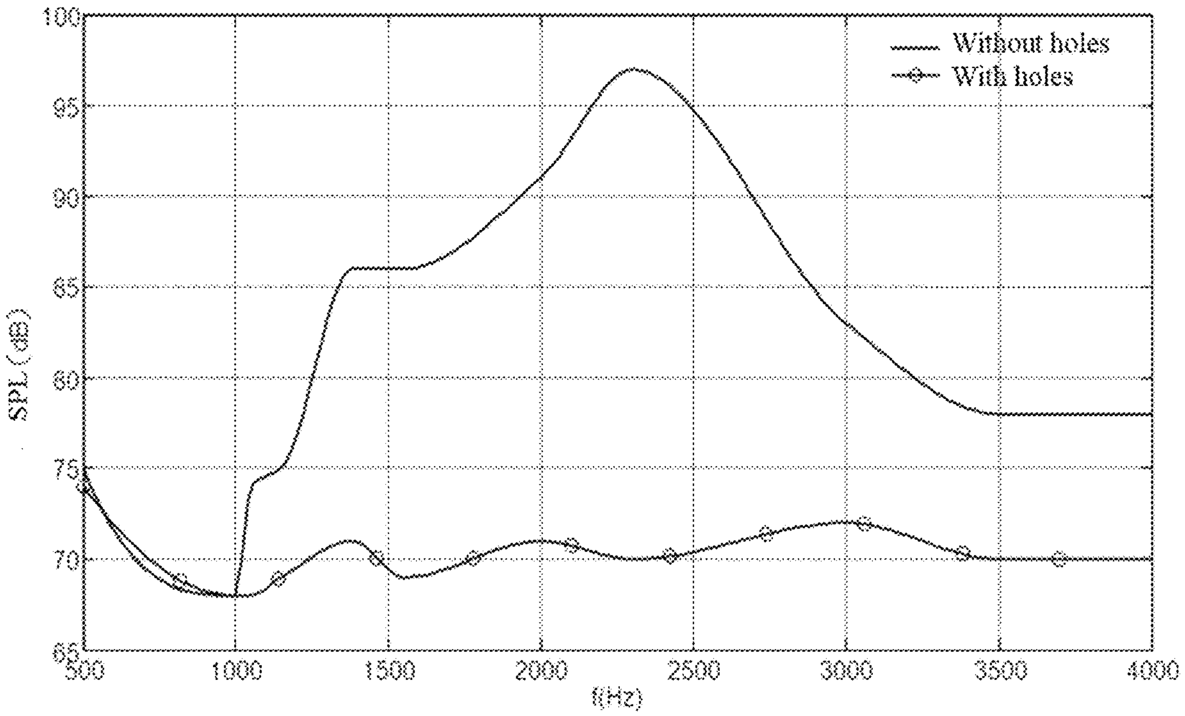
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1700 Hz and 2500 Hz~4000 Hz, this scheme has a better effect of reduced sound leakage than embodiment six.

Embodiment Eight

Figure 12A:
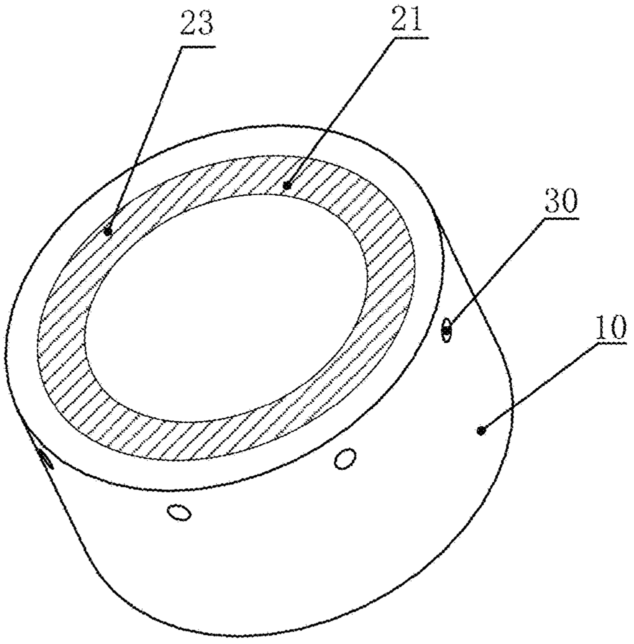
FIGS. 12A and 12B are schematic structures of an exemplary bone conduction speaker according to some embodiments of the present disclosure.
Figure 12B:
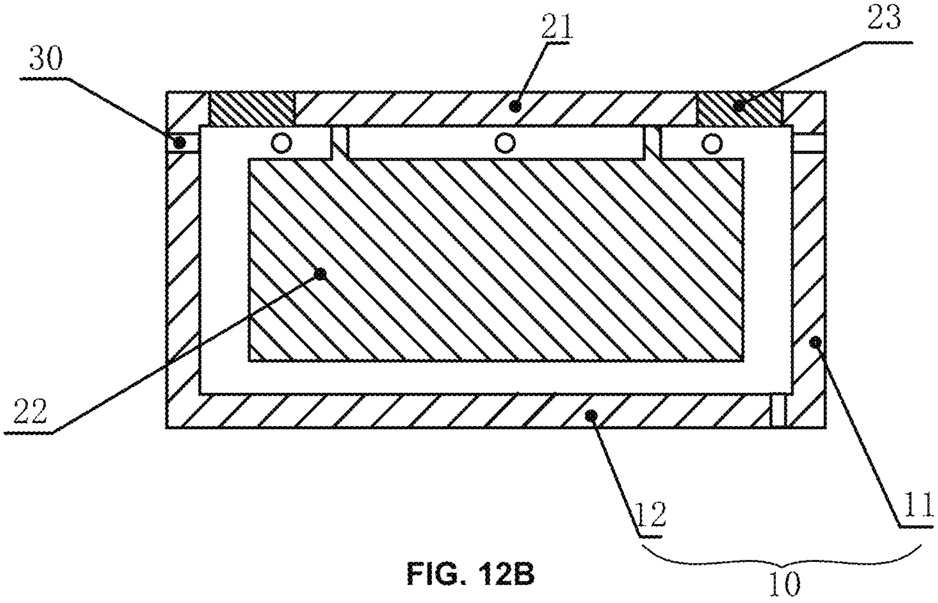

FIGS. 12A and 12B are schematic structures illustrating a bone conduction speaker according to some embodiments of the present disclosure. The bone conduction speaker may include an open housing 10, a vibration board 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
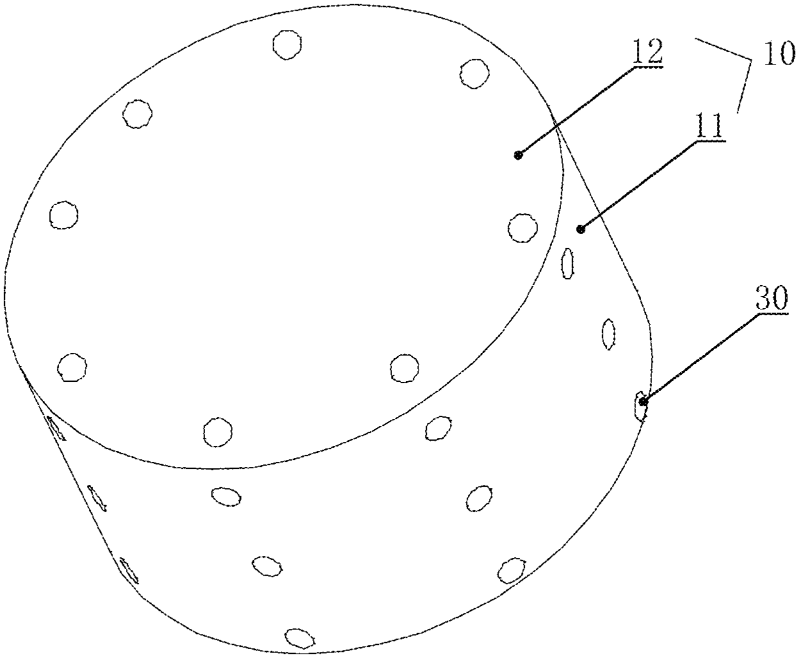
FIGS. 13A and 13B are schematic structures of an exemplary bone conduction speaker according to some embodiments of the present disclosure.
Figure 13B:
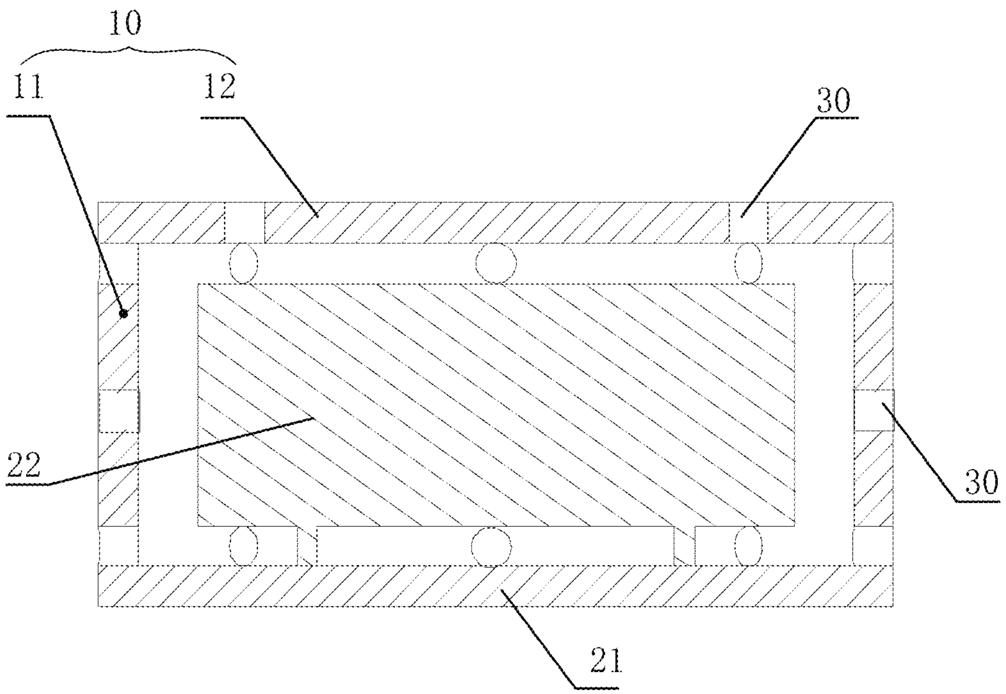

FIGS. 13A and 13B are schematic structures illustrating a bone conduction speaker according to some embodiments of the present disclosure. The bone conduction speaker may include an open housing 10, a vibration board 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

In practical applications, the speaker as described elsewhere (e.g., the speaker in FIG. 4A through FIG. 13B) may include different application forms such as bracelets, glasses, helmets, watches, clothing, or backpacks, smart headsets, earphones, etc. Merely by way of example, an earphone including the speaker and an ear hook may be provided as an example.

Figure 14:
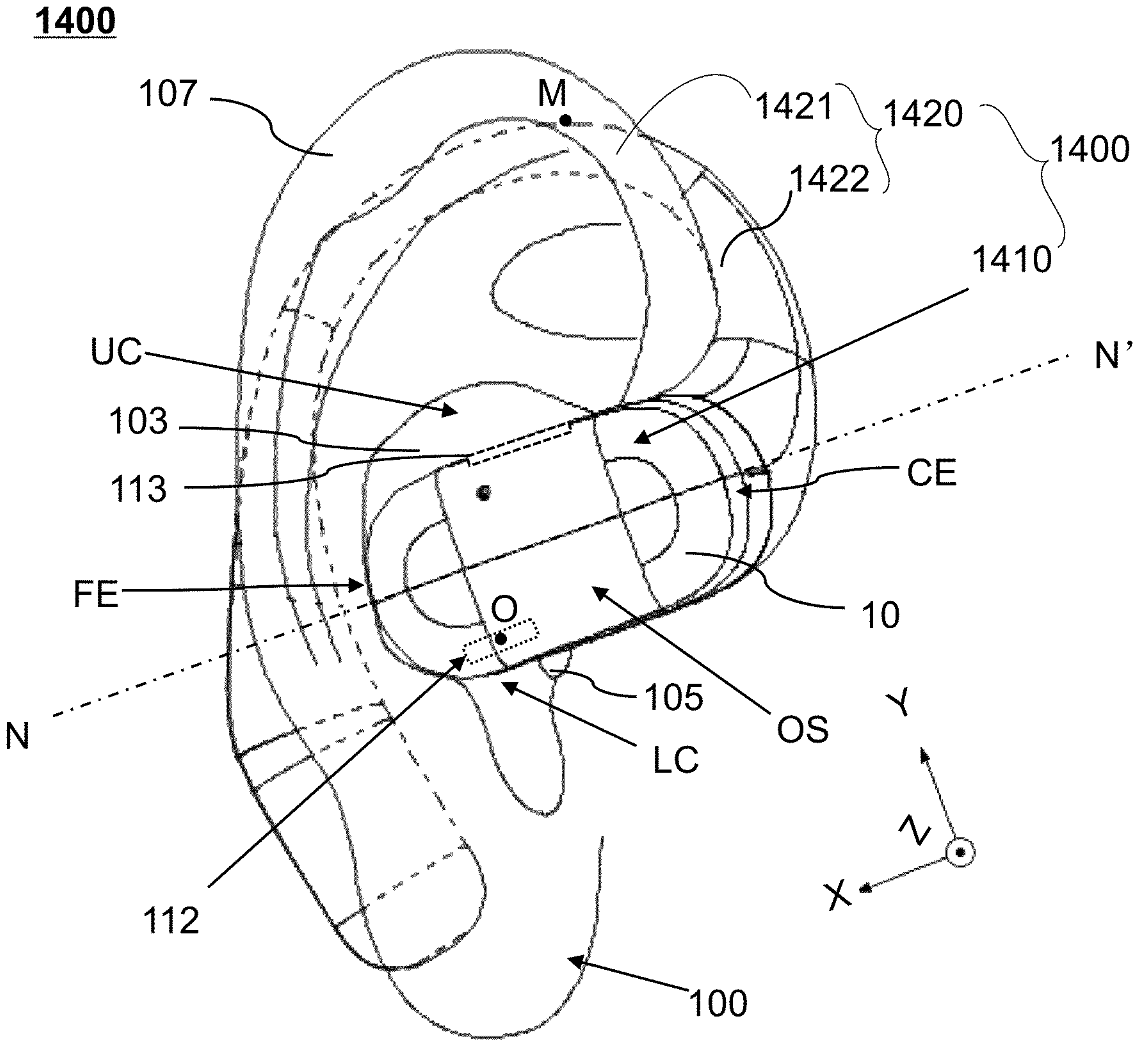
FIG. 14 is a schematic diagram illustrating an exemplary wearing state of an earphone according to some embodiments of the present disclosure.
Figure 15:
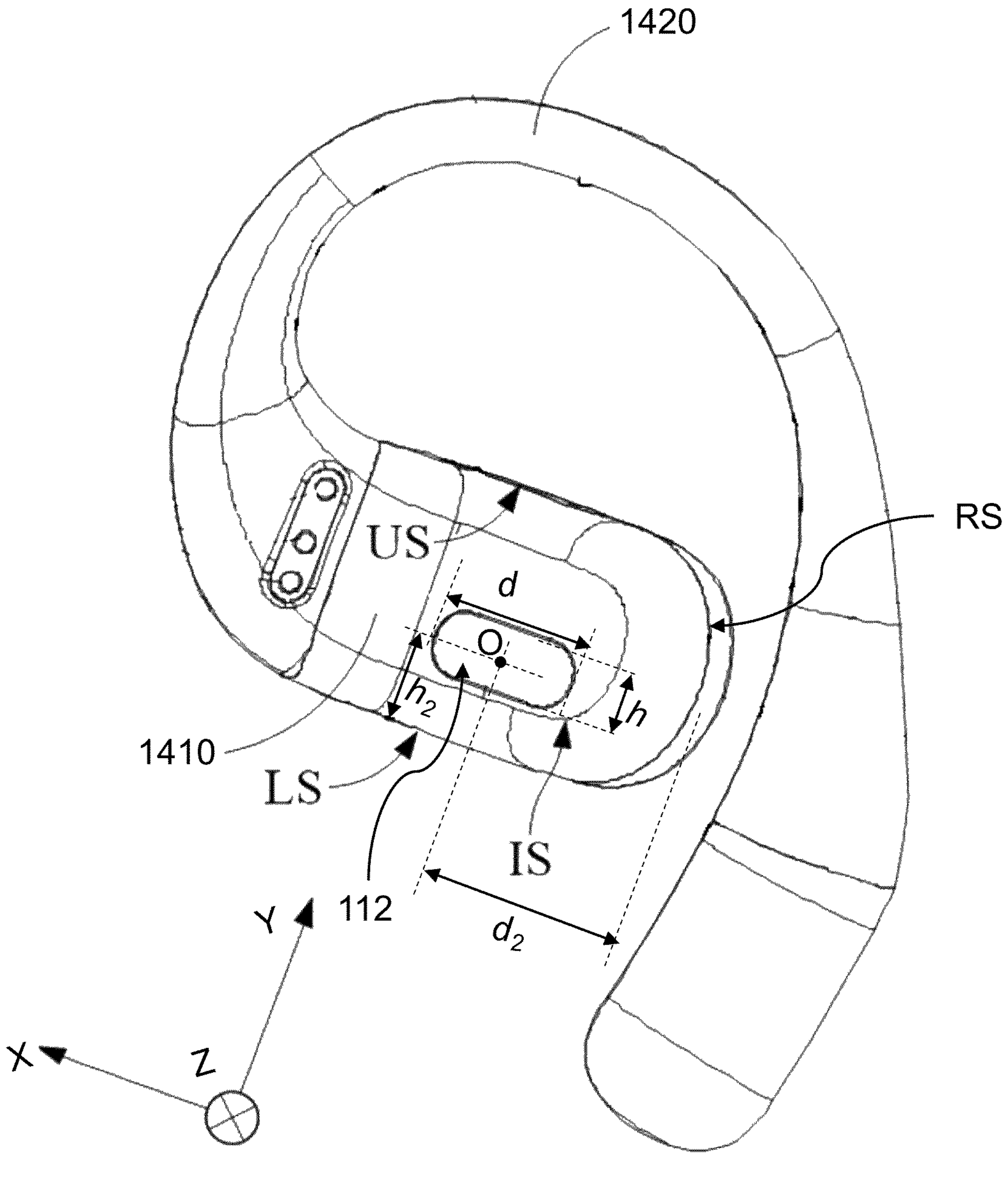
FIG. 15 is a schematic diagram illustrating a structure of a side of the earphone shown in FIG. 14 facing the ear.

FIG. 14 is a schematic diagram illustrating an exemplary wearing state of an earphone according to some embodiments of the present disclosure. FIG. 15 is a schematic diagram illustrating a structure of a side of the earphone shown in FIG. 14 facing the ear.

As shown in FIG. 14, an earphone 1400 may include a speaker (also be referred to as a sound production component) 1410 and an ear hook 1420.

One end of the ear hook 1420 may be connected to the sound production component 1410 and the other end of the ear hook 1420 extends along a junction between the user's ear and head. In some embodiments, the ear hook 1420 may be an arc-shaped structure that is adapted to the user's auricle, so that the ear hook 1420 can be hung on the user's auricle. For example, the ear hook 1420 may have an arc-shaped structure adapted to the junction of the user's head and ear, so that the ear hook 1420 can be hung between the user's ear and head. In some embodiments, the ear hook 1420 may also be a clamping structure adapted to the user's auricle, so that the ear hook 1420 can be clamped at the user's auricle. Exemplarily, the ear hook 1420 may include a hook portion 1421 (i.e., a first portion) and a connection portion 1422 (i.e., a second portion) that are connected in sequence. The connection portion 1422 connects the hook portion 1421 to the sound production component 1410 so that the earphone 1400 is curved in the three-dimensional space when it is in a non-wearing state (i.e., in a natural state). In other words, in the three-dimensional space, the hook portion, the connection portion, and the sound production component 1410 are not co-planar. In such cases, when the earphone 1400 is in the wearing state, the hook portion may be primarily for hanging between a rear side of the user's ear and the head, and the sound production component 1410 may be primarily for contacting a front side of the user's ear, thereby allowing the sound production component 1410 and the hook portion 1421 to cooperate to clamp the ear. Exemplarily, the connection portion may extend from the head toward an outside of the head and cooperate with the hook portion 1421 to provide a compression force on the front side of the ear for the sound production component 1410. The sound production component 1410 may specifically be pressed against an area where a part such as the ear's cavum concha 103, the concha boat, the triangular fossa, the antihelix, etc., is located under the compression force so that the external ear canal 105 of the ear 100 is not obscured when the earphone 1400 is in the wearing state. In the present disclosure, when the earphone 1400 is worn by a user, at least part of the earphone 1400 is inserted into the ear's cavum concha 103 may be provided as an example.

It should be noted that different users may have individual differences, resulting in different shapes, dimensions, etc., of ears. For ease of description and understanding, if not otherwise specified, the present disclosure primarily uses a "standard" shape and dimension ear model as a reference and further describes the wearing manners of an acoustic device (e.g., the earphone 1400 in FIG. 14) in different embodiments on the ear model. For example, a simulator (e.g., GRAS 45BC KEMAR) containing a head and (left and right) ears produced based on standards of ANSI: 53.36, S3.25 and IEC: 60318-7, may be used as a reference for wearing the acoustic device to present a scenario in which most users wear the acoustic device normally. Merely by way of example, the reference ear may have the following relevant features: a projection of an auricle on a sagittal plane in a vertical axis direction may be in a range of 49.5 mm-74.3 mm, and a projection of the auricle on the sagittal plane in a sagittal axis direction may be in a range of 36.6 mm-55 mm. Thus, in the present disclosure, the descriptions such as "worn by the user," "in the wearing state," and "in the wearing state" may refer to the acoustic device described in the present disclosure being worn on the ear of the aforementioned simulator. Of course, considering the individual differences of different users, structures, shapes, dimensions, thicknesses, etc., of one or more parts of the ear may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) may have different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the "front side of the ear" as described in the present disclosure is a concept relative to the "rear side of the ear," where the former refers to a side of the ear away from the head and the latter refers to a side of the ear facing the head. In this case, when the acoustic device is in the wearing state, observing the ear of the above simulator in a direction along the coronal axis of the human body, a schematic diagram illustrating the front side of the ear as shown in FIG. 14 is obtained.

In some embodiments, the housing 10 may be provided with a sound outlet 112 on a side of the housing 10 toward the ear, and the sound outlet 112 is used to transmit air inside the housing 10 out of the housing 10 and into the ear canal so that the user can hear the sound transmitted by the sound outlet 112. In some embodiments, the sound production component 1410 may include a diaphragm. The diaphragm may divide the housing 10 to form a front cavity (e.g., a front cavity 114 shown in FIG. 16A) and a rear cavity (e.g., a rear cavity 115 shown in FIG. 16A) of the earphone 1400, and the sound outlet 112 may communicate with the front cavity and transmit the sound generated by the front cavity out of the housing 10 and into the ear canal. In some embodiments, a portion of the sound exported through the sound outlet 112 may be transmitted to the ear canal thereby allowing the user to hear the sound, and another portion thereof may be transmitted with the sound reflected by the ear canal through a gap between the sound production component 1410 and the ear (e.g., a portion of the cavum concha not covered by the sound production component 1410) to the outside of the earphone 1400 and the ear, thereby creating a leaked sound wave in the far-field. At the same time, the housing 10 may be provided with one or more pressure relief holes (e.g., the pressure relief hole 113 shown in FIG. 14) on other sides of the housing 10 (e.g., a side away from or back from the user's ear canal). The pressure relief holes 113 are further away from the ear canal than the sound outlet 112, and the sound transmitted by the pressure relief holes 113 forms a guided sound wave in the far-field. The sound outlet 112 and the pressure relief hole 113 may be regarded as the aforementioned two-point sound sources. An intensity of the aforementioned leaked sound wave is the same as or similar to an intensity of the aforementioned guided sound wave, and a phase of the aforementioned leaked sound wave and a phase of the aforementioned guided sound wave are opposite (or substantially opposite) to each other so that the aforementioned leaked sound wave and the aforementioned guided sound wave can cancel each other out in the far-field, which is conducive to reducing the leakage of the earphone 1400 in the far-field.

In some embodiments, the ear hook 1420 may include, but is not limited to, an ear hook, an elastic band, etc., allowing the earphone 1400 to be better fixed to the user and prevent the user from dropping it during use. In some embodiments, the earphone 1400 may not include the ear hook 1420, and the sound production component 1410 may be placed in the vicinity of the user's ear using a hanging or clamping manner.

In some embodiments, the sound production component 1410 may be, for example, circular, elliptical, runway-shaped, polygonal, U-shaped, V-shaped, semi-circular, or other regular or irregular shapes so that the sound production component 1410 may be hung directly at the user's ear 100. In some embodiments, the sound production component 1410 may have a long-axis direction X and a short-axis direction Y that are perpendicular to the thickness direction Z and orthogonal to each other. The long-axis direction X may be defined as a direction having the largest extension dimension in a shape of a two-dimensional projection plane (e.g., a projection of the sound production component 1410 in a plane on which its outer side surface is located, or a projection on a sagittal plane) of the sound production component 1410. For example, when the projection shape is rectangular or approximately rectangular, the long-axis direction is a length direction of the rectangle or approximately rectangle. The short-axis direction Y may be defined as a direction perpendicular to the long-axis direction X in the shape of the projection of the sound production component 1410 on the sagittal plane. For example, when the projection shape is rectangular or approximately rectangular, the short-axis direction is a width direction of the rectangle or approximately rectangle. The thickness direction Z may be defined as a direction perpendicular to the two-dimensional projection plane, for example, in the same direction as a coronal axis, both pointing to the left-and-right side of the body.

As shown in FIG. 14, the ear hook 1420 is an arc-shaped structure that fits at the junction of the user's head and ear. The sound production component 1410 (or the housing 10 of the sound production component 1410) may have a connection end CE connected to the ear hook 1420 and a free end FE not connected to the ear hook 1420. When the earphone 1400 is in the wearing state, a first portion 1421 of the ear hook 1420 (e.g., a hook portion of the ear hook 1420) is positioned between the user's ear (e.g., the helix 107) and the head, and a second portion 1422 of the ear hook 1420 (e.g., a connection portion of the ear hook) extends toward a side of the auricle away from the head and connects to the connection end CE of the sound production component 1410 to hold the sound production component 1410 in a position near the ear canal but without blocking the ear canal.

Referring to FIGS. 14 and 15, the sound production component 1410 may have an inner side surface IS (also called an inner side surface of the housing 10) facing the ear along the thickness direction Z in the wearing state, an outer side surface OS (also called an outer side surface of the housing 10) away from the ear 100, and a connection surface connecting the inner side surface IS and the outer side surface OS. It should be noted that in the wearing state, when viewed along a direction in which the coronal axis (i.e., the thickness direction Z), the sound production component 1410 may be provided in a shape of a circle, an oval, a rounded square, a rounded rectangle, etc. When the sound production component 1410 is provided in the shape of a circle, an ellipse, etc., the above-mentioned connection surface may refer to an arc-shaped side surface of the sound production component 1410; and when the sound production component 1410 is set in the shape of a rounded square, a rounded rectangle, etc., the above-mentioned connection surface may include a lower side surface LS (also referred to as a lower side surface of the housing 10), an upper side surface US (also referred to as an upper side surface of the housing 10), and a rear side surface RS (also referred to as a rear side surface of the housing 10) as mentioned later. The upper side surface US and the lower side surface LS may refer to a side of the sound production component 1410 in the wearing state along the short-axis direction Y away from the external ear canal 105 and a side of the sound production component 1410 in the wearing state along the short-axis direction Y facing to the external ear canal 105, respectively; and the rear side surface RS may refer to a side of the sound production component 1410 in the wearing state along the length direction Y toward the back of the head. For the sake of description, this embodiment is exemplarily illustrated with the sound production component 1410 set in a rounded rectangle. The length of the sound production component 1410 in the long-axis direction X may be greater than the width of the sound production component 1410 in the short-axis direction Y. In some embodiments, the rear side surface RS of the earphone may be curved in order to improve the aesthetics and wearing comfort of the earphone.

In some embodiments, the sound production component 1410 is inclined, and the housing 10 of the sound production component 1410 is at least partially inserted into the ear's cavum concha 103, for example, the free end FE of the sound production component 1410 may extend into the cavum concha. The ear hook 1420 and the sound production component 1410 of such a structure are better adapted to the ear of the user, and can increase the resistance of the earphone 1400 to fall off from the ear, thus increasing the wearing stability of the earphone 1400.

In some embodiments, in the wearing state, when viewed along the thickness direction Z, the connection end CE of the sound production component 1410 is closer to the top of the head compared to the free end FE, so as to facilitate the free end FE to extend into the cavum concha. Based on this, an angle between the long-axis direction X and a direction where the sagittal axis of the human body is located may be between 15° and 60°. If the aforementioned angle is too small, it is easy to cause the free end FE to be unable to extend into the cavum concha, and make the sound outlet 112 on the sound production component 1410 too far away from the ear canal; if the aforementioned angle is too large, it is also easy to cause the sound production component 1410 to fail to extend into the cavum concha, and make the ear canal be blocked by the sound production component 1410. In other words, such setting not only allows the sound production component 1410 to extend into the cavum concha, but also allows the sound outlet 112 on the sound production component 1410 to have a suitable distance from the ear canal, so that the user can hear more sounds produced by the sound production component 1410 under the condition that the ear canal is not blocked.

In some embodiments, the sound production component 1410 and the ear hook 1420 may jointly clamp the aforementioned ear region from both front and rear sides of the ear region corresponding to the cavum concha, thereby increasing the resistance of the earphone 1400 to dropping from the ear and improving the stability of the earphone 1400 in the wearing state. For example, the free end FE of the sound production component 1410 is pressed and held in the cavum concha in the thickness direction Z. As another example, the free end FE is pressed against the cavum concha in the long-axis direction X and in the short-axis direction Y.

In some embodiments, since the ear hook itself is elastic, a distance between the sound production component and the ear hook may change between the wearing state and the non-wearing state (a distance in the non-wearing state is less than a distance in the wearing state). In addition, due to the physiological structure of the ear 100, in the wearing state, a plane where the sound production component 1410 is located may have a certain distance along the coronal axis direction from a plane where the ear hook 1420 is located, so that the sound production component 1410 can exert a proper pressure on the ear. In some embodiments, in order to improve the wearing comfort of the earphone 1400, and to make the sound production component 1410 cooperate with the ear hook 1420 to press and hold the sound production component 1410 on the ear, in the non-wearing state, a distance from the center O of the sound outlet 112 to the plane where the ear hook 1420 is located is between 3 mm and 6 mm. Since the ear hook 1420 has a non-regular shape, for example, the ear hook 1420 may be a curved structure, the plane where the ear hook 1420 is located (also referred to as an ear hook plane) may be considered to be that: in the non-wearing state, when the ear hook is placed flat on a plane, the plane is tangent to at least three points on the ear hook that constitute the ear hook plane. In some embodiments, in the wearing state, the ear hook may be approximated as fitting to the head, in this case, the deflection of the ear hook plane with respect to the sagittal plane may be negligible. In some embodiments, in the non-wearing state, the distance from the center O of the sound outlet 112 to the plane where the ear hook 1420 is located is between 3.5 mm and 5.5 mm. In some embodiments, in the non-wearing state, the distance from the center O of the sound outlet 112 to the plane where the ear hook 1420 is located is between 4.0 mm and 5.0 mm. In some embodiments, in the non-wearing state, the distance from the center O of the sound outlet 112 to the plane where the ear hook 1420 is located is between 4.3 mm and 4.7 mm.

As shown in FIG. 14, when the user wears the earphone 1400, by setting the housing 10 of the sound production component 1410 to be at least partially inserted into the cavum concha 103, a cavity enclosed by the inner side surface IS of the sound production component 1410 and the cavum concha 103 together may be regarded as a cavity structure Gaps formed between the inner side surface IS and the cavum concha (e.g., a first leaking structure UC formed between the inner side surface IS and the cavum concha close to the top of the head, and a second leaking structure LC formed between the inner side surface IS and the ear close to the ear canal) may be regarded as leaking structures. The sound outlet 112 provided on the inner side surface IS may be regarded as a point sound source inside the cavity structure, and the pressure relief hole 113 provided on the other sides of the sound production component 1410 (e.g., a side away from or back from the user's ear canal) may be regarded as a point sound source outside the cavity structure. Thus, when the earphone 1400 is worn in a manner in which it is at least partially inserted into the cavum concha, i.e., when it is worn in the manner shown in FIG. 14, in terms of the listening effect, most of the sound radiated from the sound outlet 112 may reach the ear canal by the direct emission or reflection manner, which may result in a significant increase in the volume of the sound reaching the ear canal, especially the listening volume of the low and middle frequencies. At the same time, only a relatively small portion of the inversion sound radiated from the pressure relief hole 113 may enter the cavum concha through the slit (the first leaking structure UC and the second leaking structure LC), which has a weak cancellation effect with the sound outlet 112, thereby making the listening volume of the ear canal significantly improved. In terms of the sound leakage effect, the sound outlet 112 may output sound to the outside world through the slit and the sound may cancel out the sound generated by the pressure relief hole 113 in the far-field, thus ensuring the sound leakage reduction effect.

In some embodiments, referring to FIGS. 14 and 15, in order to enable the projection of the sound outlet 112 on the sagittal plane when the earphone 1400 is worn to be partially or fully located within the cavum concha region, while enhancing the sound intensity of the sound outlet 112 in the ear canal 105, the sound outlet 112 may be set as close to the ear canal as possible. In some embodiments, a distance h 2 from the center O of the sound outlet 112 along the Y-direction to the lower side surface LS of the sound production component 1410 is in a range of 4.05 mm to 6.05 mm. In some embodiments, the distance h 2 from the center O of the sound outlet 112 along the Y-direction to the lower side surface LS of the sound production component 1410 is in a range of 4.50 mm to 5.85 mm. In some embodiments, the distance h 2 from the center O of the sound outlet 112 along the Y-direction to the lower side surface LS of the sound production component 1410 is in a range of 4.80 mm to 5.50 mm. In some embodiments, the distance h 2 from the center O of the sound outlet 112 along the Y-direction to the lower side surface LS of the sound production component 1410 is in a range of 5.20 mm to 5.55 mm.

In some embodiments, in order to cause the sound production component 1410 to be at least partially inserted into the cavum concha, the long-axis dimension of the sound production component 1410 cannot be too long. Under the premise of ensuring that the sound production component 1410 is at least partially inserted into the cavum concha, a distance from the center O of the sound outlet 112 along the X-direction to the rear side surface RS of the sound production component 1410 cannot be too small, otherwise, all or part of the area of the sound outlet may be blocked due to the abutment of the free end FE against a wall surface of the cavum concha, thereby reducing the effective area of the sound outlet. Thus, in some embodiments, a distance d2 from the center O of the sound outlet 112 along the X-direction to the rear side surface RS of the sound production component 1410 is in a range of 8.15 mm to 12.25 mm. In some embodiments, the distance d2 from the center O of the sound outlet 112 along the X-direction to the rear side surface RS of the sound production component 1410 is in a range of 8.50 mm to 12.00 mm. In some embodiments, the distance d2 from the center O of the sound outlet 112 along the X-direction to the rear side surface RS of the sound production component 1410 is in a range of 8.85 mm to 11.65 mm. In some embodiments, the distance d2 from the center O of the sound outlet 112 along the X-direction to the rear side surface RS of the sound production component 1410 is in a range of 9.25 mm to 11.15 mm. In some embodiments, the distance d2 from the center O of the sound outlet 112 along the X-direction to the rear side surface RS of the sound production component 1410 is in a range of 9.60 mm to 10.80 mm.

It should be known that since the sound outlet 112 and the pressure relief hole 113 are provided on the housing 10 and each side wall of the housing 10 has a certain thickness, the sound outlet 112 and the pressure relief hole 113 are both holes with a certain depth. At this time, the sound outlet 112 and the pressure relief hole 113 may both have an inner opening and an outer opening. For ease of description, in the present disclosure, the center O of the sound outlet 112 described above and below may refer to the centroid of the outer opening of the sound outlet 112. In some embodiments, the rear side surface RS of the earphone may be curved in order to enhance the aesthetics and wearing comfort of the earphone. When the rear side surface RS is curved, a distance between a position (e.g., the center O of the sound outlet 112) and the rear side surface RS may refer to a distance from that position to a tangent plane of the rear side surface RS that is farthest from the center of the sound production component and parallel to the short-axis of the sound production component.

Figure 16A:
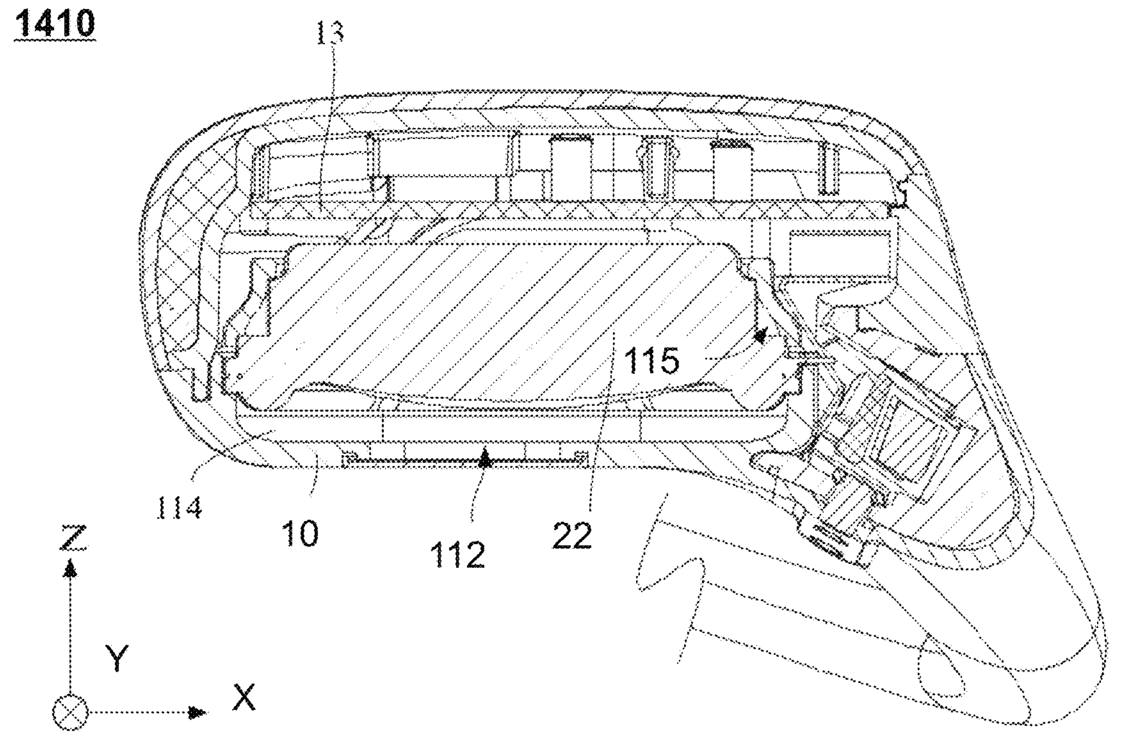
FIG. 16A is a diagram illustrating an exemplary internal structure of a sound production component according to some embodiments of the present disclosure.

FIG. 16A is a diagram illustrating an exemplary internal structure of a sound production component according to some embodiments of the present disclosure.

As shown in FIG. 16A, the sound production component 1410 may include a transducer 30, a master control circuit board 13 provided within the housing 10 and a battery (not shown) provided at one end of the ear hook 1420 away from the sound production component 1410. The battery and the air conduction transducer are electrically connected to the master control circuit board 13, respectively, to allow the battery to power the air conduction transducer under the control of the master control circuit board 13. Of course, both the battery and the air conduction transducer may also be provided within the sound production component 1410, and the battery may be closer to the connection end CE while the air conduction transducer may be closer to the free end FE.

In some embodiments, the earphone 1400 may include an adjustment mechanism connecting the sound production component 1410 and the ear hook 1420. Different users are able to adjust the relative position of the sound production component 1410 on the ear through the adjustment mechanism in the wearing state so that the sound production component 1410 is located at a suitable position, thus making the sound production component 1410 form a cavity structure with the cavum concha. In addition, due to the presence of the adjustment mechanism, the user is also able to adjust the earphone 1400 to wear to a more stable and comfortable position.

Since the cavum concha has a certain volume and depth, after the free end FE is inserted into the cavum concha, there may be a certain distance between the inner side surface IS and the cavum concha of the sound production component 1410. In other words, the sound production component 1410 and the cavum concha may cooperate to form a cavity structure communicated with the external ear canal in the wearing state, and the sound outlet 112 may be at least partially located in the aforementioned cavity structure. In this way, in the wearing state, the sound waves transmitted by the sound outlet 112 are limited by the aforementioned cavity structure, i.e., the aforementioned cavity structure can gather sound waves, so that the sound waves can be better transmitted to the external ear canal, thus improving the volume and sound quality of the sound heard by the user in the near-field, which is beneficial to improve the acoustic effect of the earphone 1400. Further, since the sound production component 1410 may be set so as not to block the external ear canal in the wearing state, the aforementioned cavity structure may be in a semi-open setting. In this way, a portion of the sound waves transmitted by the sound outlet 112 may be transmitted to the ear canal thereby allowing the user to hear the sound, and another portion thereof may be transmitted with the sound reflected by the ear canal through a gap between the sound production component 1410 and the ear (e.g., a portion of the cavum concha not covered by the sound production component 1410) to the outside of the earphone 1400 and the ear, thereby creating a leaked sound wave in the far-field. At the same time, the sound waves transmitted through the pressure relief hole 113 opened on the sound production component 1410 forms a guided sound wave in the far-field. An intensity of the aforementioned leaked sound wave is the same as or similar to an intensity of the aforementioned guided sound wave, and a phase of the aforementioned leaked sound wave and a phase of the aforementioned guided sound wave are opposite (or substantially opposite) to each other, so that the aforementioned leaked sound wave and the aforementioned guided sound wave can cancel each other out in the far-field, which is conducive to reducing the leakage of the earphone 1400 in the far-field.

In some embodiments, the sound production component 1410 mainly includes a housing 10 connected to the ear hook 1420 and the air conduction transducer inside the housing 10, wherein the inner side surface IS of the housing 10 facing the ear in the wearing state is provided with the sound outlet 112, through which the sound waves generated by the air conduction transducer are transmitted for transmission into the external ear canal 105. It should be noted that: the sound outlet 112 may also be provided on the lower side surface LS of the housing 10 and may also be provided at a corner between the aforementioned inner side surface IS and the lower side surface LS.

In some embodiments, a front cavity 114 and a rear cavity 115 may be formed by the air conduction transducer. The front cavity 114 may be formed between the air conduction transducer and the housing 10. The sound outlet 112 is provided in a region on the housing 10 that forms the front cavity 114, and the front cavity 114 is communicated with the outside world through the sound outlet 112.

In some embodiments, the front cavity 114 is set between a diaphragm of the air conduction transducer and the housing 10. In order to ensure that the diaphragm has a sufficient vibration space, the front cavity 114 may have a large depth dimension (i.e., a distance dimension between the diaphragm of the air conduction transducer and the housing 10 directly opposite to it). In some embodiments, as shown in FIG. 16A, the sound outlet 112 is set on the inner side surface IS in the thickness direction Z. At this point, the depth of the front cavity 114 may refer to a dimension of the front cavity 114 in the Z-direction. However, too large the depth of the front cavity 114 may lead to an increase in the dimension of the sound production component 1410 and affect the wearing comfort of the earphone 1400. In some embodiments, the depth of the front cavity 114 may be in a range of 0.55 mm-1.00 mm. In some embodiments, the depth of the front cavity 114 may be in a range of 0.66 mm-0.99 mm. In some embodiments, the depth of the front cavity 114 may be in a range of 0.76 mm-0.99 mm. In some embodiments, the depth of the front cavity 114 may be in a range of 0.96 mm-0.99 mm. In some embodiments, the depth of the front cavity 114 may be 0.97 mm.

In order to improve the sound production effect of the earphone 1400, a resonance frequency of a structure similar to a Helmholtz resonator formed by the front cavity 114 and the sound outlet 112 should be as high as possible, so that the overall frequency response curve of the sound production component has a wide flat region. In some embodiments, a resonance frequency f1 of the front cavity 114 may be no less than 3 kHz. In some embodiments, the resonance frequency f1 of the front cavity 114 may be no less than 4 kHz. In some embodiments, the resonance frequency f1 of the front cavity 114 may be no less than 6 kHz. In some embodiments, the resonance frequency f1 of the front cavity 114 may be no less than 7 kHz. In some embodiments, the resonance frequency f1 of the front cavity 114 may be no less than 8 kHz.

In some embodiments, the front cavity 114 and the sound outlet 112 may be approximately regarded as a Helmholtz resonator model. The front cavity 114 may be the cavity of the Helmholtz resonator model and the sound outlet 112 may be the neck of the Helmholtz resonator model. At this time, the resonance frequency of the Helmholtz resonator model is the resonance frequency f1 of the front cavity 114. In the Helmholtz resonator model, the dimension of the neck (e.g., the sound outlet 112) may affect the resonance frequency f of the cavity, and the specific relationship is shown in equation (14):

$$f = \frac{c}{2\pi}\sqrt{\frac{S}{VL}}, \tag{14}$$

where c represents the speed of sound, S represents a cross-sectional area of the neck (e.g., the sound outlet 112), V represents the volume of the cavity (e.g., the front cavity 114), and L represents the depth of the neck (e.g., the sound outlet 112).

From equation (14), it can be seen that when the cross-sectional area S of the sound outlet 112 is increased and the depth L of the sound outlet 112 is reduced, the resonance frequency f1 of the front cavity 114 increases and moves toward high frequency.

In some embodiments, a total air volume of the sound outlet 112 forms a sound mass that can resonate with a system (e.g., the Helmholtz resonator) to produce a low-frequency output. Thus, a relatively small sound mass may affect the low-frequency output of the Helmholtz resonator model. In turn, the dimension of the sound outlet 112 also affects the sound mass Ma of the sound outlet 112, and the specific relationship is shown in equation (15):

$$M_a = \frac{\rho L}{S}, \tag{15}$$

where ρ represents an air density, S represents the cross-sectional area of the sound outlet 112, and L represents the depth of the sound outlet 112.

From equation (15), it can be seen that when the cross-sectional area S of the sound outlet 112 is increased and the depth L is reduced, the sound mass Ma of the sound outlet 112 decreases.

Combining equation (14) and equation (15), it can be seen that the larger a value of a ratio S/L of the cross-sectional area S to the depth L of the sound outlet 112 is, the larger the resonance frequency $f_1$ of the front cavity 114 is, and the smaller the sound mass Ma of the sound outlet 112 is. Therefore, the ratio S/L of the cross-sectional area S to the depth L of the sound outlet 112 needs to be in a suitable range, specific descriptions can be seen, for example, in FIG. 17A, FIG. 17B, and FIG. 18B.

Figure 16B:
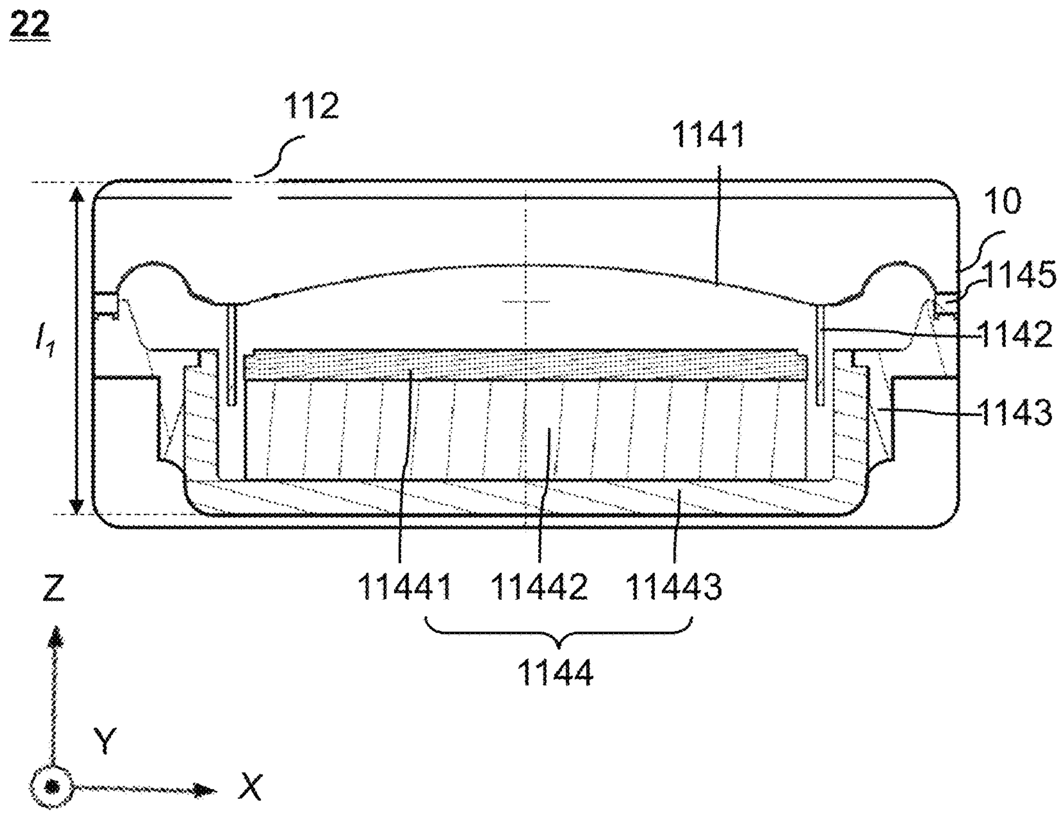
FIG. 16B is a diagram illustrating an exemplary internal structure of a transducer according to some embodiments of the present disclosure.

FIG. 16B is a diagram illustrating an exemplary internal structure of a transducer according to some embodiments of the present disclosure.

As shown in FIG. 16B, the housing 10 accommodates the air conduction transducer. The air conduction transducer includes a diaphragm 1141, a voice coil 1142, a cone holder 1143, and a magnetic circuit assembly 1144. The cone holder 1143 is provided around the diaphragm 1141, the voice coil 1142, and the magnetic circuit assembly 1144 to provide a fixing platform for mounting. The air conduction transducer may be connected to the housing 10 through the cone holder 1143. The diaphragm 1141 covers the voice coil 1142 and the magnetic circuit assembly 1144 in the Z-direction, and the voice coil 1142 extends into the magnetic circuit assembly 1144 and is connected to the diaphragm 1141. A magnetic field generated after the voice coil 1142 is energized interacts with a magnetic field formed by the magnetic circuit assembly 1144, thereby driving the diaphragm 1141 to produce a mechanical vibration, which in turn produces sound through the dissertation of media such as air, and the sound is output through the sound outlet 112.

In some embodiments, the magnetic circuit assembly 1144 includes a magnetic conduction plate 11441, a magnet 11442, and an accommodation member 11443. The magnetic conduction plate 11441 and the magnet 11442 are interconnected. The magnet 11442 is mounted on a bottom wall of the accommodation member 11443 on a side away from the magnetic conduction plate 11441, and the magnet 11442 has a gap between a peripheral side of the magnet 11442 and an inner side wall of the accommodation member 11443. In some embodiments, an outer side wall of the accommodation member 11443 is connected and fixed to the cone holder 1143. In some embodiments, both the accommodation member 11443 and the magnetic conduction plate 11441 may be made of a magnetically conductive material (e.g., iron, etc.).

In some embodiments, a peripheral side of the diaphragm 1141 may be connected to the cone holder 1143 by a fixing ring 1145. In some embodiments, a material of the fixing ring 1145 may include a stainless-steel material or any other metal material to adapt to the processing and manufacturing process of the diaphragm 1141.

Referring to FIG. 16A and FIG. 16B, in some embodiments, in order to improve the acoustic output (especially low frequency output) effect of the sound production component 1410 and improve the ability of the diaphragm 1141 to push the air, a projection area of the diaphragm 1141 along the Z direction is as large as possible. However, too large the area of the diaphragm 1141 leads to too large a dimension of the air conduction transducer, which in turn causes too large the housing 10, thus easily causing the housing 10 to collide and rub against the ear, thereby affecting the wearing comfort of the sound production component 1410. Therefore, the dimension of the housing 10 needs to be designed. Exemplarily, a dimension (e.g. 17 mm) of the cavum concha along the Y-direction may determine a width dimension of the housing 10 in the Y-direction, and then a suitable length-to-short ratio (i.e. a ratio of the dimension of the housing 10 in the Y-direction to a dimension of the housing 10 in the X-direction) is selected according to the wearing comfort, so as to determine the length dimension (e.g. 21.49 mm) of the housing 10 in the X-direction to match the dimension of the cavum concha along the Y-direction.

In some embodiments, in order to enable most users to wear the earphone 1400 with the sound production component 1410 at least partially inserted into the cavum concha to form a cavity structure with better acoustics, for example, such that the earphone 1400 forms the first leaking structure UC and the second leaking structure LC between the earphone 1400 and the user's ear when the earphone 1400 is worn to improve the acoustic performance of the earphone, the dimension of the housing 10 may take a value in a preset range. In some embodiments, depending on a width dimension range of the cavum concha along the Y-direction, the width dimension of the housing 10 along the Y-direction may be in a range of 11 mm-16 mm. In some embodiments, the width dimension of the housing 10 along the Y-direction may be in a range of 11 mm-15 mm. In some embodiments, the width dimension of the housing 10 along the Y-direction may be in a range of 13 mm-14 mm. In some embodiments, a ratio of the dimension of the housing 10 along the X-direction to the dimension of the housing 10 along the Y-direction may be in a range of 1.2-5. In some embodiments, the ratio of the dimension of the housing 10 along the X-direction to the dimension of the housing 10 along the Y-direction may be in a range of 1.4-4. In some embodiments, the ratio of the dimension of the housing 10 along the X-direction to the dimension of the housing 10 along the Y-direction may be in a range of 1.5-2. In some embodiments, the length dimension of the housing 10 along the X-direction may be in a range of 15 mm-30 mm. In some embodiments, the length dimension of the housing 10 along the X-direction may be in a range of 16 mm-28 mm. In some embodiments, the length dimension of the housing 10 along the X-direction may be in a range of 19 mm-24 mm. In some embodiments, in order to avoid the large volume of the housing 10 affecting the wearing comfort of the earphone 1400, a thickness dimension of the housing 10 along the Z-direction may be in a range of 5 mm-20 mm. In some embodiments, the thickness dimension of the housing 10 along the Z-direction may be in a range of 5.1 mm-18 mm. In some embodiments, the thickness dimension of the housing 10 along the Z-direction may be in a range of 6 mm-15 mm. In some embodiments, the thickness dimension of the housing 10 along the Z-direction may be in a range of 7 mm-10 mm. In some embodiments, an area of the inner surface IS of the housing 10 (in the case where the inner surface IS is rectangular, the area is equal to a product of the length dimension and the width dimension of the housing 10) may be 90 $mm^2$-560 $mm^2$. In some embodiments, the area of the inner side surface IS may be considered to approximate the projection area of the diaphragm 1141 along the Z-direction. For example, the area of the inner side surface IS may differ by less than 10% from the projection area of the diaphragm 1141 along the Z-direction. In some embodiments, the area of the inner side surface IS may be 150 $mm^2$-360 $mm^2$. In some embodiments, the area of the inner side surface IS may be 160 mm 2 to 240 $mm^2$. In some embodiments, the area of the inner side surface IS may be 180 $mm^2$-200 $mm^2$. When the earphone 1400 is worn in the manner shown in FIG. 14, on the basis that the dimension of the earphone 1400 satisfies the wearing comfort, the acoustic performance of the earphone 1400 is superior to the existing earphones, that is, the dimension of the earphone 1400 can be smaller than the existing earphones while achieving the same excellent acoustic performance.

Referring to FIGS. 16A and 16B, in some embodiments, a distance from the center O of the sound outlet 112 along the Z-direction to a bottom surface of the magnetic circuit assembly 1144 may be related to a vibration range of the diaphragm 1141 and a thickness of the magnetic circuit assembly 1144. The vibration range of the diaphragm 1141 may affect the amount of air pushed by the transducer of the sound production component 1410. The greater the vibration range of the diaphragm 1141 is, the greater the amount of air pushed by the transducer of the sound production component 1410 is, and the higher the sound production efficiency of the sound production component is. The greater the thickness of the magnetic circuit assembly 1144 is, the greater the total weight of the sound production component 1410 is, which affects the comfort of the user. In addition, when the thickness of the sound production component in the Z-direction is a constant, the smaller the distance from the center O of the sound outlet 112 along the Z-direction to the bottom surface of the magnetic circuit assembly 1144 is, the larger the volume of the rear cavity may be. At this time, according to the aforementioned equation (14), it is known that the smaller the resonance frequency of the rear cavity is, the resonance peak of the rear cavity moves to lower frequency, and a smaller range of the flat region of the frequency response curve is. In order to ensure that the sound production efficiency of the sound production component is sufficiently high, that the resonance frequency of the rear cavity is in a suitable frequency range (e.g., 1000 Hz-5000 Hz), and that the user is comfortable enough to wear, considering the structural strength, the difficulty of process implementation, and the overall thickness of the housing 10, the distance $l_1$ from the center O of the sound outlet 112 along the Z-direction to the bottom surface of the magnetic circuit assembly 1144 (i.e., a side of the accommodation member 11443 along the Z-direction away from the sound outlet 112) is in a range of 5.65 mm to 8.35 mm. In some embodiments, the distance $l_1$ from the center O of the sound outlet 112 along the Z-direction to the bottom surface of the magnetic circuit assembly 1144 is in a range of 6.00 mm to 8.00 mm. In some embodiments, the distance $l_1$ from the center O of the sound outlet 112 along the Z-direction to the bottom surface of the magnetic circuit assembly 1144 is in a range of 6.35 mm to 7.65 mm. In some embodiments, the distance $l_1$ from the center O of the sound outlet 112 along the Z-direction to the bottom surface of the magnetic circuit assembly 1144 is in a range of 6.70 mm to 7.30 mm. In some embodiments, the distance $l_1$ from the center O of the sound outlet 112 along the Z-direction to the bottom surface of the magnetic circuit assembly 1144 is in a range of 6.95 mm to 7.05 mm.

In some embodiments, a distance from the center O of the sound outlet 112 to a long-axis center plane (e.g., a plane NN' perpendicular to an inward surface of the paper as shown in FIG. 14) of the magnetic circuit assembly 1144 is in a range of 1.45 mm to 2.15 mm. In the present disclosure, the long-axis center plane of the magnetic circuit assembly 1144 is a plane parallel to the lower side surface LS of the sound production component 1410 and passing through the geometric center of the magnetic circuit assembly 1144. In other words, the long-axis center plane of the magnetic circuit assembly 1144 may divide the magnetic circuit assembly 1144 into two identical parts along the X-direction. The distance from the center O of the sound outlet 112 to the long-axis center plane of the magnetic circuit assembly 1144 is also a distance from the center O of the sound outlet 112 along the short-axis direction Y to the long-axis center plane. In some embodiments, the distance from the center O of the sound outlet 112 to the long-axis center plane is in a range of 1.55 mm to 2.05 mm. In some embodiments, the distance from the center O of the sound outlet 112 to the long-axis center plane is in a range of 1.65 mm to 1.95 mm. In some embodiments, the distance from the center O of the sound outlet 112 to the long-axis center plane is in a range of 1.75 mm to 1.85 mm.

Figure 17A:
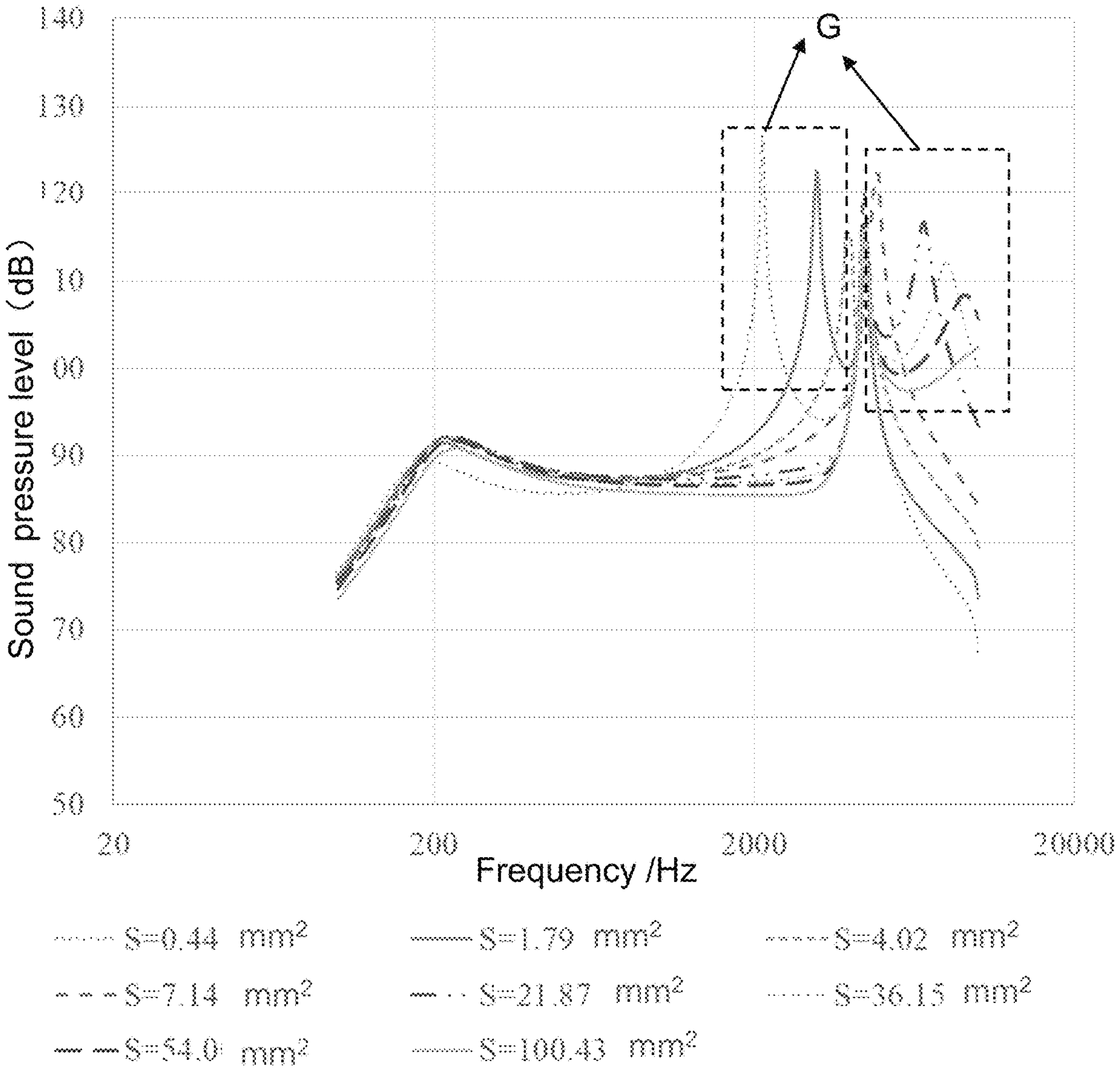
FIG. 17A is a frequency response curve diagram of an earphone corresponding to sound outlets of different cross-sectional areas at a certain aspect ratio according to some embodiments of the present disclosure.

FIG. 17A is a frequency response curve diagram of an earphone corresponding to sound outlets of different cross-sectional areas at a certain aspect ratio according to some embodiments of the present disclosure. FIG. 17A illustrates frequency response curves corresponding to the earphone 1400 when the other structures (e.g., the pressure relief hole 113, the volume of the rear cavity, etc.) are fixed and when the aspect ratio of the sound outlet is fixed and when the cross-sectional area of the sound outlet is in a range of 0.44 mm 2 to 100.43 $mm^2$. As can be seen from FIG. 17A, under the above conditions, as the cross-sectional area S of the sound outlet 112 gradually increases, the resonance frequency f1 (i.e., a frequency corresponding to the resonance peak in the dotted circle G) corresponding to the front cavity in the frequency response curve of the earphone 1400 gradually shifts to high frequency, and then the resonance frequency corresponding to the rear cavity remains at about 4.5 kHz. Specifically, as the cross-sectional area S of the sound outlet 112 increases, the resonance peak of the front cavity gradually moves to high frequency. When the resonance peak of the front cavity moves to about 4.5 kHz, the resonance frequencies of the front cavity and the rear cavity may be basically equal, and during this process, the peak value of the resonance peak remains basically unchanged. After the resonance peak of the front cavity moves to 4.5 kHz, if the cross-sectional area S of the sound outlet 112 continues to be increased, the peak value of the resonance peak of the front cavity shows a clear tendency to gradually decrease. Therefore, in some embodiments, in order to make the frequency response curve of the earphone 1400 have a wide flat region, the cross-sectional area S of the sound outlet 112 may be larger than 2.87 $mm^2$. Preferably, in order to make the frequency response curve of the earphone 1400 flat in a range of 100 Hz to 2.3 kHz, the cross-sectional area S of the sound outlet 112 may be larger than 4.0 $mm^2$. Preferably, in order to make the frequency response curve of the earphone 1400 flat in a range from 100 Hz to 3.3 kHz, the cross-sectional area S of the sound outlet 112 may be larger than 7.0 $mm^2$.

Further, within a certain cross-sectional area S of the sound outlet 112, as the cross-sectional area S of the sound outlet 112 increases, the resonance peak of the front cavity gradually decreases while moving to high frequency. Therefore, in some embodiments, in order to improve the sound quality of the earphone 1400 as well as to facilitate the adjustment of EQ, the frequency response of the earphone 1400 in a high frequency range (e.g., 4.5 kHz to 9 kHz) needs to be sufficient, thus the cross-sectional area S of the sound outlet 112 may be less than 54 $mm^2$. Preferably, in order to make the frequency response curve of the earphone 1400 sufficient in a range of 4.5 kHz-8 kHz, the cross-sectional area S of the sound outlet 112 may be smaller than 36.15 $mm^2$. More preferably, in order to make the frequency response curve of the earphone 1400 sufficient in a range from 4.5 kHz to 6.5 kHz, the cross-sectional area S of the sound outlet 112 may be less than 21.87 $mm^2$. In the present disclosure, for ease of description, the cross-sectional area S of the sound outlet 112 may refer to an area of an outer opening of the sound outlet 112 (i.e., an opening area of the sound outlet 112 on the inner side surface). It should be known that in some other embodiments, the cross-sectional area S of the sound outlet 112 may also refer to an area of an inner opening of the sound outlet 112, or an average of the area of the inner opening and the area of the outer opening of the sound outlet 112.

Figure 17B:
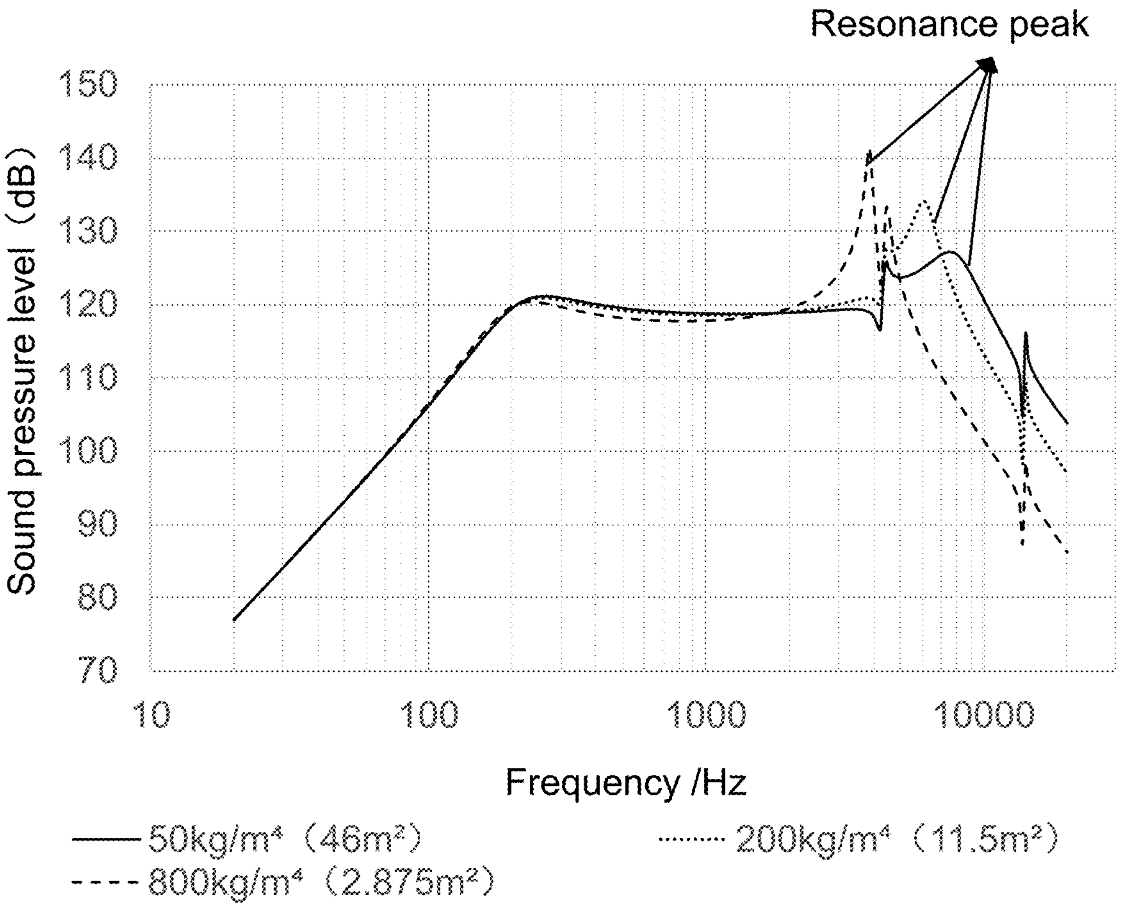
FIG. 17B is a frequency response curve diagram illustrating of a front cavity corresponding to different cross-sectional areas of sound outlets according to some embodiments of the present disclosure.

FIG. 17B is a frequency response curve diagram of a front cavity corresponding to different cross-sectional areas of sound outlets according to some embodiments of the present disclosure. As shown in FIG. 17B, when the cross-sectional area S of the sound outlet 112 increases from 2.875 mm 2 to 46.10 $mm^2$, the sound mass Ma of the sound outlet 112 decreases from 800 kg/m4 to 50 kg/m4, and the resonance frequency f1 of the front cavity gradually increases from about 4 kHz to about 8 kHz. It should be noted that the parameters, such as 200 kg/m4 and 800 kg/m4 shown in FIG. 17B represent only a theoretical sound mass of the sound outlet 112, and there may be an error with an actual sound mass of the sound outlet 112.

In order to improve the acoustic output effect of the earphone 1400, while increasing the resonance frequency f1 of the front cavity and ensuring that the sound mass Ma of the sound outlet 112 is large enough, the cross-sectional area S of the sound outlet 112 needs to have a suitable range of values. In addition, in the actual design, if the cross-sectional area of the sound outlet 112 is too large, it may have a certain impact on the appearance, structural strength, water and dust resistance and other aspects of the earphone 1400. In some embodiments, the cross-sectional area S of the sound outlet 112 may be in a range of 2.87 mm 2 to 46.10 $mm^2$. In some embodiments, the cross-sectional area S of the sound outlet 112 may be in a range of 2.875 $mm^2$-46 $mm^2$. In some embodiments, the cross-sectional area S of the sound outlet 112 may be in a range of 10 $mm^2$-30 $mm^2$. In some embodiments, the cross-sectional area S of the sound outlet 112 may be 25.29 $mm^2$. In some embodiments, the cross-sectional area S of the sound outlet 112 may be in a range of 25 $mm^2$-26 $mm^2$.

In some embodiments, in order to increase the wearing stability of the earphone 1400, the area of the inner side surface IS of the sound production component 1410 needs to be adapted to the dimension of the human cavum concha. In addition, when the sound production component 1410 is worn by inserting it into the cavum concha, since the inner side surface IS and a side wall of the cavum concha form a cavity structure, the sound production efficiency of the sound production component 1410 is high compared to a conventional wearing manner (e.g., placing the sound production component 1410 on a front side of the helix foot). At this time, the overall dimension of the sound production component may be designed to be smaller. Therefore, a ratio of the area of the sound outlet 112 to the area of the inner side surface IS may be designed to be relatively large. At the same time, the area of the sound outlet should not be too large, otherwise, it may affect the waterproof and dustproof structure at the sound outlet and the stability of the support structure. The area of the inner side surface IS should not be too small, otherwise, it may affect the area of the transducer to push the air. In some embodiments, the ratio of the cross-sectional area S of the sound outlet 112 to the area of the inner side surface IS may be in a range of 0.015 to 0.25. In some embodiments, the ratio of the cross-sectional area S of the sound outlet 112 to the area of the inner side surface IS may be in a range of 0.02 to 0.2. In some embodiments, the ratio of the cross-sectional area S of the sound outlet 112 to the area of the inner side surface IS may be in a range of 0.06 to 0.16. In some embodiments, the ratio of the cross-sectional area S of the sound outlet 112 to the area of the inner side surface IS may be in a range of 0.1 to 0.12.

In some embodiments, consisting that the inner side surface IS may need to be in contact with the ear (e.g., the cavum concha), in order to improve the wearing comfort, the inner side surface IS may be designed as a non-planar structure. For example, an edge region of the inner side surface IS has a certain curvature relative to a central region, or a region on the inner side surface IS near the free end FE is provided with a convex structure to better abut against with the ear region, etc. In this case, in order to better reflect the influence of the cross-sectional area of the sound outlet 112 on the wearing stability and sound production efficiency of the earphone 1400, the ratio of the cross-sectional area S of the sound outlet 112 to the area of the inner side surface IS may be replaced with a ratio of the cross-sectional area S of the sound outlet 112 to the projection area of the inner side surface IS in the vibration direction of the diaphragm (i.e., the Z-direction in FIG. 16A). In some embodiments, a ratio of the cross-sectional area S of the sound outlet 112 to a projection area of the inner surface IS along the vibration direction of the diaphragm may be in a range of 0.016 to 0.255. Preferably, the ratio of the cross-sectional area S of the sound outlet 112 to a projection area of the inner surface IS along the vibration direction of the diaphragm may be in a range of 0.022 to 0.21.

In some embodiments, a projection area of the diaphragm of the transducer in its vibration direction may be equal to or slightly less than the projection area of the inner side surface IS along the vibration direction of the diaphragm. In this case, a ratio of the cross-sectional area S of the sound outlet 112 to the projection area of the diaphragm in its vibration direction may be in a range of 0.016 to 0.261. Preferably, the ratio of the cross-sectional area S of the sound outlet 112 to a projection area of the inner surface IS along the vibration direction of the diaphragm may be in a range of 0.023 to 0.23.

In some embodiments, the shape of the sound outlet 112 also has an effect on an acoustic resistance of the sound outlet 112. The narrower and longer the sound outlet 112 is, the higher the acoustic resistance of the sound outlet 112 is, which is not conducive to the acoustic output of the front cavity 114. Therefore, in order to ensure that the sound outlet 112 has a suitable acoustic resistance, a ratio of the long-axis dimension to the short-axis dimension of the sound outlet 112 (also called an aspect ratio of the sound outlet 112) needs to be within a preset appropriate range.

In some embodiments, the shape of the sound outlet 112 may include, but is not limited to, a circle, an oval, a runway shape, etc. For the sake of description, the following exemplary illustration is provided with the sound outlet 112 in a runway shape as an example. In some embodiments, as shown in FIG. 15, the sound outlet 112 may adopt the runway shape, wherein the ends of the runway shape may be minor arced or semicircular. In this case, the long-axis dimension of the sound outlet 112 may be a maximum dimension (e.g., the long-axis dimension d as shown in FIG. 15) of the sound outlet 112 along the X-direction, and the short-axis dimension (e.g., the short-axis dimension h as shown in FIG. 15) of the sound outlet 112 may be a maximum dimension of the sound outlet 112 along the Y-direction.

Figure 18A:
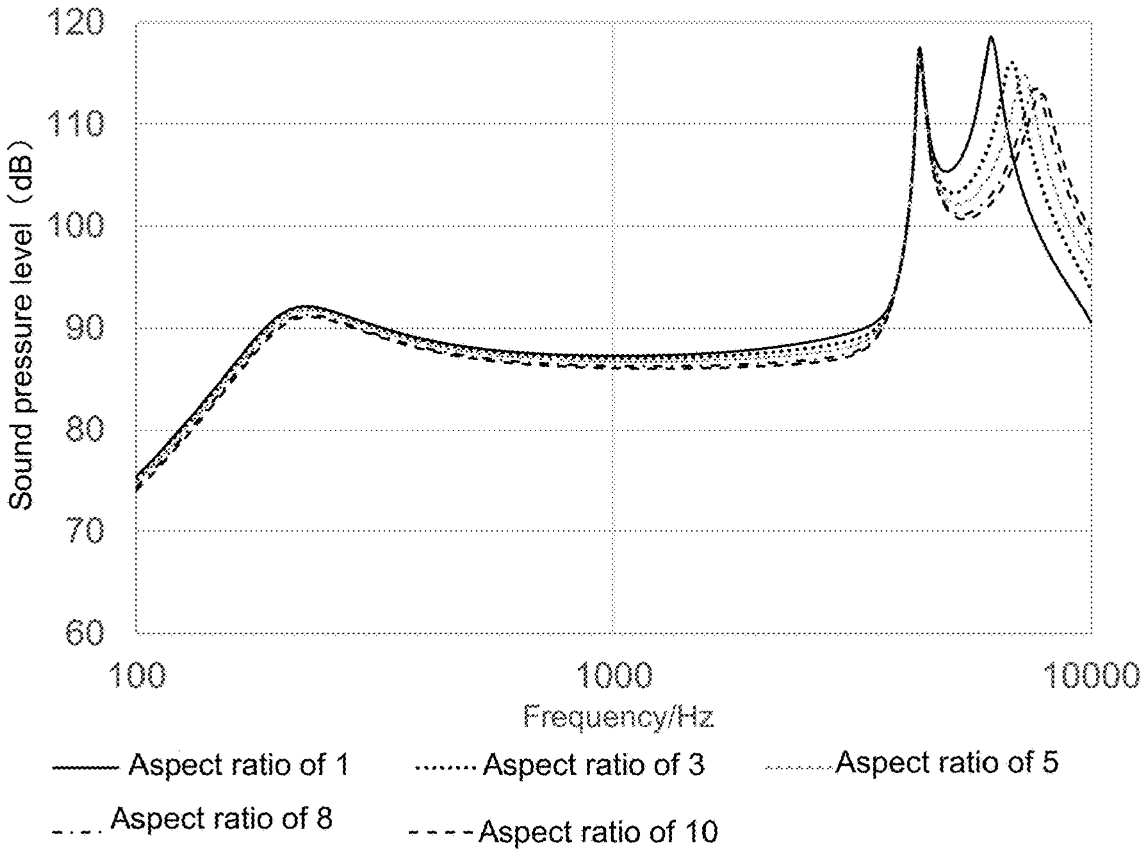
FIG. 18A is a frequency response curve diagram of an earphone corresponding to different aspect ratios of sound outlets according to some embodiments of the present disclosure.

FIG. 18A is a frequency response curve diagram of an earphone corresponding to different aspect ratios of sound outlets according to some embodiments of the present disclosure. FIG. 18A illustrates a frequency response curve of the earphone corresponding to a sound outlet with aspect ratios of 1, 3, 5, 8, and 10, respectively when the other structures (e.g., the pressure relief hole 113, the volume of the rear cavity, etc.) are fixed and the area of the sound outlet is a constant.

As can be seen from FIG. 18A, when the cross-sectional area of the sound outlet 112 is a constant, as the aspect ratio of the sound outlet 112 increases, the resonance frequency f1 of the resonance peak of the front cavity 114 gradually moves toward high frequency, and the intensity of the resonance peak gradually decreases. Therefore, when the cross-sectional area of the sound outlet 112 is a constant, in order to ensure that the intensity of the resonance peak of the front cavity is strong enough, the ratio of the long-axis dimension of the sound outlet 112 to the short-axis dimension of the sound outlet 112 may be in a range from 1 to 10. In some embodiments, the ratio of the long-axis dimension of the sound outlet 112 to the short-axis dimension of the sound outlet 112 may be in a range from 2 to 8. In some embodiments, the ratio of the long-axis dimension of the sound outlet 112 to the short-axis dimension of the sound outlet 112 may be in a range from 2 to 4. In some embodiments, the long-axis dimension of the sound outlet 112 may be 7.67 mm and the short-axis dimension of the sound outlet 112 may be 3.62 mm.

Figure 18B:
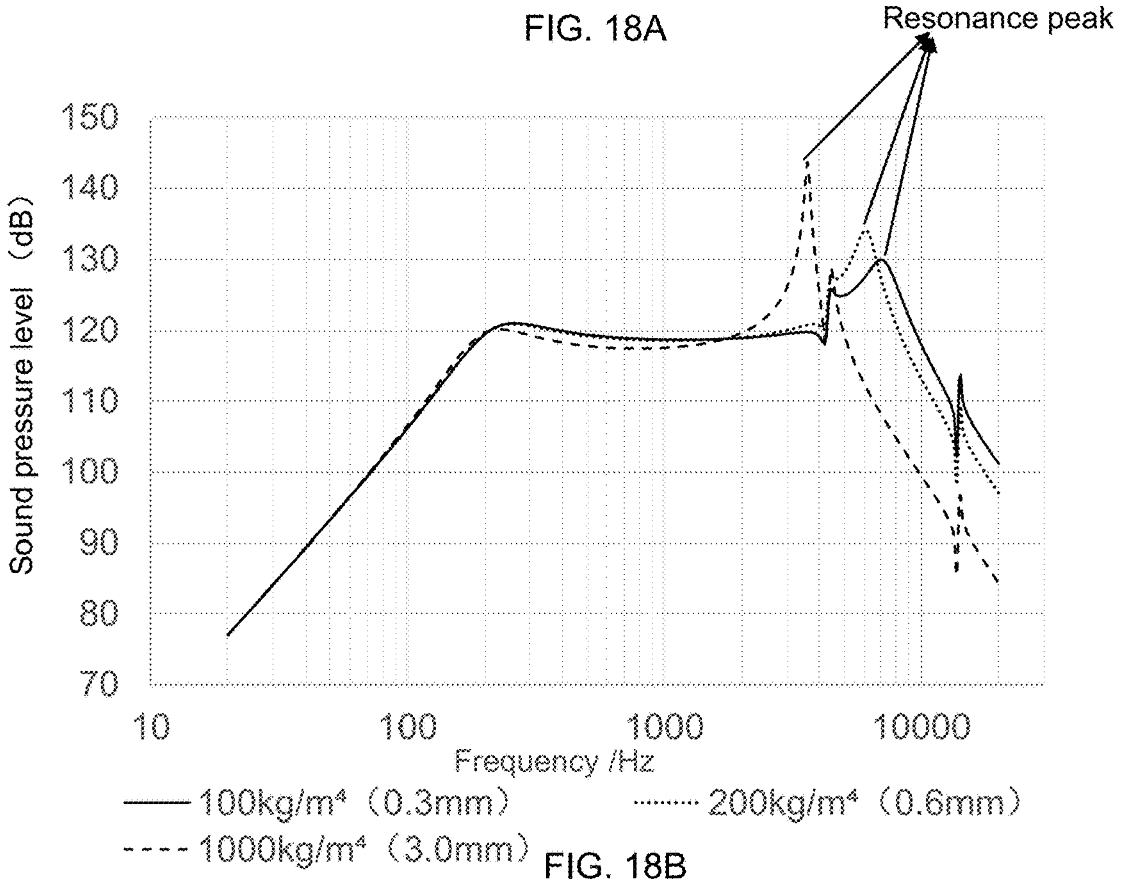
FIG. 18B is a frequency response curve diagram of a front cavity corresponding to different depths of sound outlets according to some embodiments of the present disclosure.

FIG. 18B is a frequency response curve diagram of a front cavity corresponding to different depths of sound outlets according to some embodiments of the present disclosure. As shown in FIG. 18B, when the depth L of the sound outlet 112 increases from 0.3 mm to 3 mm, the sound mass Ma of the sound outlet 112 increases from 100 kg/m4 to 1000 kg/m4, and the resonance frequency f1 of the front cavity decreases from about 7 kHz to about 3.7 kHz.

In order to ensure that the front cavity has a sufficiently large resonance frequency, according to equation (14), the depth L of the sound outlet 112 is taken to be as small as possible. However, since the sound outlet 112 is set on the housing 10, the depth of the sound outlet 112 is the thickness of the side wall of the housing 10. When the thickness of the housing 10 is too small, the structural strength of the earphone 1400 may be affected, and the corresponding manufacturing process is more difficult. In some embodiments, the depth L of the sound outlet 112 may be in a range of 0.3 mm-3 mm. In some embodiments, the depth L of the sound outlet 112 may be in a range of 0.3 mm-2 mm. In some embodiments, the depth L of the sound outlet 112 may be 0.3 mm. In some embodiments, the depth L of the sound outlet 112 may be 0.6 mm.

In some embodiments, according to equation (14), in the case where the volume of the front cavity is not easily changed, the larger the ratio $S/L^2$ of the cross-sectional area S of the sound outlet 112 to the square of the depth L is, the higher the resonance frequency of the front cavity is and the better the sound emitted from the sound outlet is in the low and middle frequency range. However, since the cross-sectional area S of the sound outlet 112 should not be too large, and the depth L (the thickness of the housing 10) should not be too small, in some embodiments, the ratio $S/L^2$ of the cross-sectional area S of the sound outlet 112 to the square of the depth L may be in a range of 0.31 to 512.2. In some embodiments, the ratio $S/L^2$ of the cross-sectional area S of the sound outlet 112 to the square of the depth L may be in a range of 1-400. In some embodiments, the ratio $S/L^2$ of the cross-sectional area S of the sound outlet 112 to the square of the depth L may be in a range of 3-300. In some embodiments, the ratio $S/L^2$ of the cross-sectional area S of the sound outlet 112 to the square of the depth L may be in a range of 5-200. In some embodiments, the ratio $S/L^2$ of the cross-sectional area S of the sound outlet 112 to the square of the depth L may be in a range of 10-50.

In some embodiments, an augmented reality technology and/or a virtual reality technology may be applied in the speaker so as to enhance a user's audio experience. For illustration purposes, a pair of glasses (e.g., a pair of glasses worn by a user shown in FIG. 21 or FIG. 22) with a sound output function may be provided as an example. Exemplary glasses may be or include augmented reality (AR) glasses, virtual reality (VR) glasses, etc.

Figure 19:
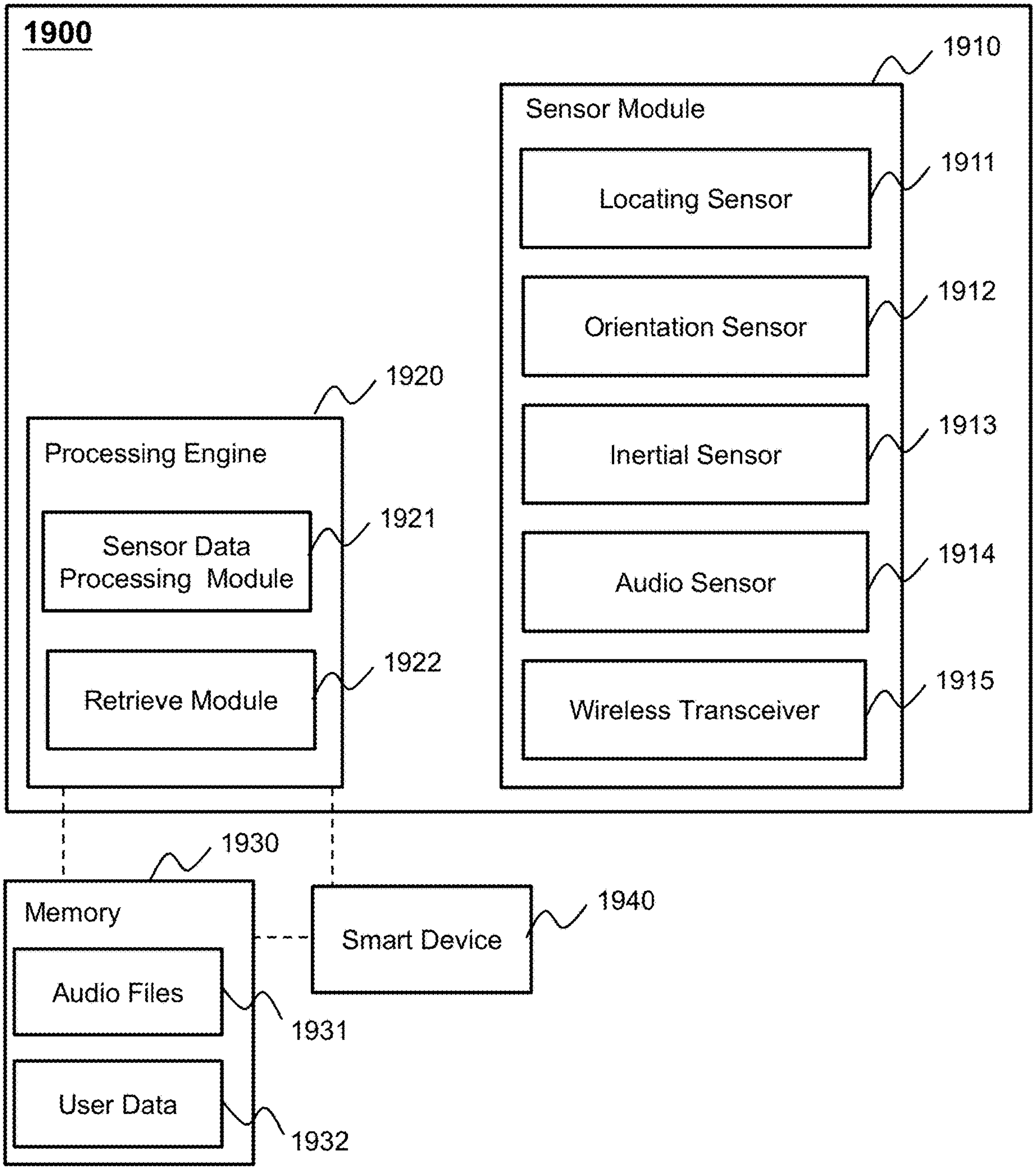
FIG. 19 is a schematic diagram illustrating an exemplary speaker customized for augmented reality according to some embodiments of the present disclosure.

FIG. 19 is a schematic diagram illustrating an exemplary speaker customized for augmented reality according to some embodiments of the present disclosure. As shown in FIG. 19, the speaker 1900 may include a sensor module 1910 and a processing engine 1920. In some embodiments, a power source assembly (not shown in FIG. 19) may also provide electrical power to the sensor module 1910 and/or the processing engine 1920.

The sensor module 1910 may include a plurality of sensors of various types. The plurality of sensors may detect status information of a user (e.g., a wearer) of the speaker. The status information may include, for example, a location of the user, a gesture of the user, a direction that the user faces, an acceleration of the user, a speech of the user, etc. A controller (e.g., the processing engine 1920) may process the detected status information, and cause one or more components of the speaker 1900 to implement various functions or methods described in the present disclosure. For example, the controller may cause at least one acoustic driver to output sound based on the detected status information. The sound output may be originated from audio data from an audio source (e.g., a terminal device of the user, a virtual audio marker associated with a geographic location, etc.). The plurality of sensors may include a locating sensor 1911, an orientation sensor 1912, an inertial sensor 1913, an audio sensor 1914, and a wireless transceiver 1915. Merely for illustration, only one sensor of each type is illustrated in FIG. 19. Multiple sensors of each type may also be contemplated. For example, two or more audio sensors may be used to detect sounds from different directions.

The locating sensor 1911 may determine a geographic location of the speaker 1900. The locating sensor 1911 may determine the location of the speaker 1900 based on one or more location-based detection systems such as a global positioning system (GPS), a Wi-Fi location system, an infra-red (IR) location system, a bluetooth beacon system, etc. The locating sensor 1911 may detect changes in the geographic location of the speaker 1900 and/or a user (e.g., the user may wear the speaker 1900, or may be separated from the speaker 1900) and generate sensor data indicating the changes in the geographic location of the speaker 1900 and/or the user.

The orientation sensor 1912 may track an orientation of the user and/or the speaker 1900. The orientation sensor 1912 may include a head-tracking device and/or a torso-tracking device for detecting a direction in which the user is facing, as well as the movement of the user and/or the speaker 1900. Exemplary head-tracking devices or torso-tracking devices may include an optical-based tracking device (e.g., an optical camera), an accelerometer, a magnetometer, a gyroscope, a radar, etc. In some embodiments, the orientation sensor 1912 may detect a change in the user's orientation, such as a turning of the torso or an about-face movement, and generate sensor data indicating the change in the orientation of the body of the user.

The inertial sensor 1913 may sense gestures of the user or a body part (e.g., head, torso, limbs) of the user. The inertial sensor 1913 may include an accelerometer, a gyroscope, a magnetometer, or the like, or any combination thereof. In some embodiments, the accelerometer, the gyroscope, and/or the magnetometer may be independent components. In some embodiments, the accelerometer, the gyroscope, and/or the magnetometer may be integrated or collectively housed in a single sensor component. In some embodiments, the inertial sensor 1913 may detect an acceleration, a deceleration, a tilt level, a relative position in the three-dimensional (3D) space, etc. of the user or a body part (e.g., an arm, a finger, a leg, etc.) of the user, and generate sensor data regarding the gestures of the user accordingly.

The audio sensor 1914 may detect sound from the user, a smart device 1940, and/or ambient environment. In some embodiments, the audio sensor 1914 may include one or more microphones, or a microphone array. The one or more microphones or the microphone array may be housed within the speaker 1900 or in another device connected to the speaker 1900. In some embodiments, the one or more microphones or the microphone array may be generic microphones. In some embodiments, the one or more microphones or the microphone array may be customized for VR and/or AR.

In some embodiments, the audio sensor 1914 may be positioned so as to receive audio signals proximate to the speaker 1900, e.g., speech/voice input by the user to enable a voice control functionality. For example, the audio sensor 1914 may detect sounds of the user wearing the speaker 1900 and/or other users proximate to or interacting with the user. The audio sensor 1914 may further generate sensor data based on the received audio signals.

The wireless transceiver 1915 may communicate with other transceiver devices in distinct locations. The wireless transceiver 1915 may include a transmitter and a receiver. Exemplary wireless transceivers may include, for example, a Local Area Network (LAN) transceiver, a Wide Area Network (WAN) transceiver, a ZigBee transceiver, a Near Field Communication (NFC) transceiver, a Bluetooth (BT) transceiver, a Bluetooth Low Energy (BTLE) transceiver, or the like, or any combination thereof. In some embodiments, the wireless transceiver 1915 may be configured to detect an audio message (e.g., an audio cache or pin) proximate to the speaker 1900, e.g., in a local network at a geographic location or in a cloud storage system connected with the geographic location. For example, another user, a business establishment, a government entity, a tour group, etc. may leave an audio message at a particular geographic or virtual location, and the wireless transceiver 1915 may detect the audio message, and prompt the user to initiate a playback of the audio message.

In some embodiments, the sensor module 1910 (e.g., the locating sensor 1911, the orientation sensor 1912, and the inertial sensor 1913) may detect that the user moves toward or looks in a direction of a point of interest (POI). The POI may be an entity corresponding to a geographic or virtual location. The entity may include a building (e.g., a school, a skyscraper, a bus station, a subway station, etc.), a landscape (e.g., a park, a mountain, etc.), or the like. In some embodiments, the entity may be an object specified by a user. For example, the entity may be a favorite coffee shop of the user. In some embodiments, the POI may be associated with a virtual audio marker. One or more localized audio messages may be attached to the audio marker. The one or more localized audio message may include, for example, a song, a pre-recorded message, an audio signature, an advertisement, a notification, or the like, or any combination thereof.

The processing engine 1920 may include a sensor data processing module 1921 and a retrieve module 1922. The sensor data processing module 1921 may process sensor data obtained from the sensor module 1910 (e.g., the locating sensor 1911, the orientation sensor 1912, the inertial sensor 1913, the audio sensor 1914, and/or the wireless transceiver 1915), and generate processed information and/or data. The information and/or data generated by the sensor data processing module 1921 may include a signal, a representation, an instruction, or the like, or any combination thereof. For example, the sensor data processing module 1921 may receive sensor data indicating the location of the speaker 1900, and determine whether the user is proximate to a POI or whether the user is facing towards a POI. In response to a determination that the user is proximate to the POI or the user is facing towards the POI, the sensor data processing module 1921 may generate a signal and/or an instruction used for causing the retrieve module 1922 to obtain an audio message (i.e., a localized audio message associated with the POI). The audio message may be further provided to the user via the speaker 1900 for playback.

Optionally or additionally, during the playback of the audio message, an active noise reduction (ANR) technique may be performed so as to reduce noise. As used herein, the ANR may refer to a method for reducing undesirable sound by generating additional sound specifically designed to cancel the noise in the audio message according to the reversed phase cancellation principle. The additional sound may have a reversed phase, a same amplitude, and a same frequency as the noise. Merely by way of example, the speaker 1900 may include an ANR component (not shown) configured to reduce the noise. The ANR component may receive sensor data generated by the audio sensor 1914, signals generated by the processing engine 1920 based on the sensor data, or the audio messages received via the wireless transceiver 1915, etc. The received data, signals, audio messages, etc. may include sound from a plurality of directions, which may include desired sound received from a certain direction and undesired sound (i.e., noise) received from other directions. The ANR component may analyze the noise, and perform an ANR operation to suppress or eliminate the noise.

In some embodiments, the ANR component may provide a signal to a transducer (e.g., the transducer 22, or any other transducers) disposed in the speaker to generate an anti-noise acoustic signal. The anti-noise acoustic signal may reduce or substantially prevent the noises from being heard by the user. In some embodiments, the anti-noise acoustic signal may be generated according to the noise detected by the speaker. The speaker may receive sound. In some embodiments, the noise may include background noise in the ambient environment around the user, sound that is not intended to be collected when a user wears the audio device, for example, a traffic noise, a wind noise, etc. For example, the noise may be detected by a noise detection component (e.g., the audio sensor 1914) of the speaker. As the audio sensor is close to the ear of the user, the detected noise may also be referred to noise heard by the user. In some embodiments, the anti-noise acoustic signal may have a same amplitude, a same frequency, and a reverse phase as the detected noise.

The processing engine 1920 may be coupled (e.g., via wireless and/or wired connections) to a memory 1930. The memory 1930 may be implemented by any storage device capable of storing data. In some embodiments, the memory 1930 may be located in a local server or a cloud-based server, etc. In some embodiments, the memory 1930 may include a plurality of audio files 1931 for playback by the speaker 1900 and/or user data 1932 of one or more users. The audio files 1931 may include audio messages (e.g., audio pins or caches created by the user or other users), audio information provided by automated agents, or other audio files available from network sources coupled with a network interface, such as a network-attached storage (NAS) device, a DLNA server, etc. The audio files 1931 may be accessible by the speaker 1900 over a local area network such as a wireless (e.g., Wi-Fi) or wired (e.g., Ethernet) network. For example, the audio files 1931 may include localized audio messages attached to virtual audio markers associated with a POI, which may be accessed when a user is proximate to or facing towards a POI.

The user data 1932 may be user-specific, community-specific, device-specific, location-specific, etc. In some embodiments, the user data 1932 may include audio information related to one or more users. Merely by ways of example, the user data 1932 may include user-defined playlists of digital music files, audio messages stored by the user or other users, information about frequently played audio files associated with the user or other similar users (e.g., those with common audio file listening histories, demographic traits, or Internet browsing histories), "liked" or otherwise favored audio files associated with the user or other users, a frequency at which the audio files 1931 are updated by the user or other users, or the like, or any combination thereof. In some embodiments, the user data 1932 may further include basic information of the one or more users. Exemplary basic information may include names, ages, careers, habits, preferences, etc.

The processing engine 1920 may also be coupled with a smart device 1940 that has access to user data (e.g., the user data 1932) or biometric information about the user. The smart device 1940 may include one or more personal computing devices (e.g., a desktop or laptop computer), wearable smart devices (e.g., a smart watch, a smart glasses), a smart phone, a remote control device, a smart beacon device (e.g., a smart Bluetooth beacon system), a stationary speaker system, or the like, or any combination thereof. In some embodiments, the smart device 1940 may include a conventional user interface for permitting interaction with the user, one or more network interfaces for interacting with the processing engine 1920 and other components in the speaker 1900. In some embodiments, the smart device 1940 may be utilized to connect the speaker 1900 to a Wi-Fi network, creating a system account for the user, setting up music and/or location-based audio services, browsing content for playback, setting assignments of the speaker 1900 or other audio playback devices, transporting control (e.g., play/pause, fast forward/rewind, etc.) of the speaker 1900, selecting one or more speaker for content playback (e.g., a single room playback or a synchronized multi-room playback), etc. In some embodiments, the smart device 1940 may further include sensors for measuring biometric information about the user. Exemplary biometric information may include travel, sleep, or exercise patterns, body temperature, heart rates, paces of gait (e.g., via accelerometers), or the like, or any combination thereof.

The retrieve module 1922 may be configured to retrieve data from the memory 1930 and/or the smart device 1940 based on the information and/or data generated by the sensor data processing module 1921, and determine audio message for playback. For example, the sensor data processing module 1921 may analyze one or more voice commands from the user (obtained from the audio sensor 1914), and determine an instruction based on the one or more voice commands. The retrieve module 1922 may obtain and/or modify a localized audio message based on the instruction. As another example, the sensor data processing module 1921 may generate signals indicating that a user is proximate to a POI and/or the user is facing towards the POI. Accordingly, the retrieve module 1922 may obtain a localized audio message associated with the POI based on the signals. As a further example, the sensor data processing module 1921 may generate a representation indicating a characteristic of a location as a combination of factors from the sensor data, the user data 1932 and/or information from the smart device 1940. The retrieve module 1922 may obtain the audio message based on the representation.

Figure 20:
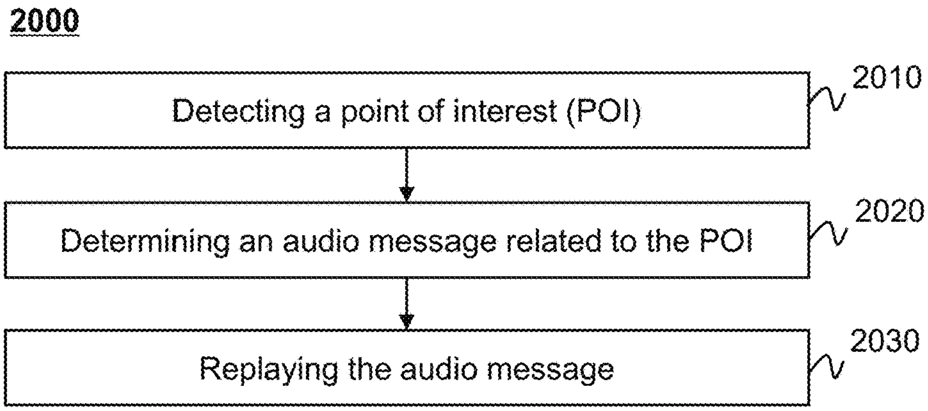
FIG. 20 is a flowchart illustrating an exemplary process for replaying an audio message according to some embodiments of the present disclosure.

FIG. 20 is a flowchart illustrating an exemplary process for replaying an audio message according to some embodiments of the present disclosure.

In 2010, a point of interest (POI) may be detected. In some embodiments, the POI may be detected by the sensor module 1910 of the speaker 1900.

As used herein, the POI may be an entity corresponding to a geographic or virtual location. The entity may include a building (e.g., a school, a skyscraper, a bus station, a subway station, etc.), a landscape (e.g., a park, a mountain, etc.), or the like, or any combination thereof. In some embodiments, the entity may be an object specified by the user. For example, the entity may be a favorite coffee shop of the user. In some embodiments, the POI may be associated with a virtual audio marker. One or more localized audio messages may be attached to the audio marker. The one or more localized audio message may include, for example, a song, a pre-recorded message, an audio signature, an advertisement, a notification, or the like, or any combination thereof.

In some embodiments, the sensor module 1910 (e.g., the locating sensor 1911, the orientation sensor 1912, and the inertial sensor 1913) may detect that a user wearing the speaker 1900 moves toward to or looks in the direction of the POI. Specifically, the sensor module 1910 (e.g., the locating sensor 1911) may detect changes in a geographic location of the user, and generate sensor data indicating the changes in the geographic location of the user. The sensor module 1910 (e.g., the orientation sensor 1912) may detect changes in an orientation of the user (e.g., the head of the user), and generate sensor data indicating the changes in the orientation of the user. The sensor module 1910 (e.g., the inertial sensor 1913) may also detect gestures (e.g., via an acceleration, a deceleration, a tilt level, a relative position in the three-dimensional (3D) space, etc. of the user or a body part (e.g., an arm, a finger, a leg, etc.)) of the user, and generate sensor data indicating the gestures of the user. The sensor data may be transmitted, for example, to the processing engine 1920 for further processing. For example, the processing engine 1920 (e.g., the sensor data processing module 1921) may process the sensor data, and determine whether the user moves toward to or looks in the direction of the POI.

In some embodiments, other information may also be detected. For example, the sensor module 1910 (e.g., the audio sensor 1914) may detect sound from the user, a smart device (e.g., the smart device 1940), and/or ambient environment. Specifically, one or more microphones or a microphone array may be housed within the speaker 1900 or in another device connected to the speaker 1900. The sensor module 1910 may detect sound using the one or more microphones or the microphone array. In some embodiments, the sensor module 1910 (e.g., the wireless transceiver 1915) may communicate with transceiver devices in distinct locations, and detect an audio message (e.g., an audio cache or pin) when the speaker 1900 is proximate to the transceiver devices. In some embodiments, other information may also be transmitted as part of the sensor data to the processing engine 1920 for processing.

In 2020, an audio message related to the POI may be determined. In some embodiments, the audio message related to the POI may be determined by the processing engine 1920.

In some embodiments, the processing engine 1920 (e.g., the sensor data processing module 1921) may generate information and/or data based at least in part on the sensor data. The information and/or data include a signal, a representation, an instruction, or the like, or any combination thereof. Merely by way of example, the sensor data processing module 1921 may receive sensor data indicating a location of a user, and determine whether the user is proximate to or facing towards the POI. In response to a determination that the user is proximate to the POI or facing towards the POI, the sensor data processing module 1921 may generate a signal and/or an instruction causing the retrieve module 1922 to obtain an audio message (i.e., a localized audio message attached to an audio marker associated with the POI). As another example, the sensor data processing module 1921 may analyze sensor data related to a voice command detected from a user (e.g., by performing a natural language processing), and generate a signal and/or an instruction related to the voice command. As a further example, the sensor data processing module 1921 may generate a representation by weighting the sensor data, user data (e.g., the user data 1932), and other available data (e.g., a demographic profile of a plurality of users with at least one common attribute with the user, a categorical popularity of an audio file, etc.). The representation may indicate a general characteristic of a location as a combination of factors from the sensor data, the user data and/or information from a smart device.

Further, the processing engine 1920 (e.g., the retrieve module 1922) may determine an audio message related to the POI based on the generated information and/or the data. For example, the processing engine 1920 may retrieve an audio message from the audio files 1931 in the memory 1930 based on a signal and/or an instruction related to a voice command. As another example, the processing engine 1920 may retrieve an audio message based on a representation and relationships between the representation and the audio files 1931. The relationships may be predetermined and stored in a storage device. As a further example, the processing engine 1920 may retrieve a localized audio message related to a POI when a user is proximate to or facing towards the POI. In some embodiments, the processing engine 1920 may determine two or more audio messages related to the POI based on the information and/or the data. For example, when a user is proximate to or facing towards the POI, the processing engine 1920 may determine audio messages including "liked" music files, audio files accessed by other users at the POI, or the like, or any combination thereof.

Taking a speaker customized for VR as an example, the speaker may determine an audio message related to a POI based at least in part on sensor data obtained by sensors disposed in the speaker. For example, the POI may be a historical site associated with a virtual audio marker having one or more localized audio messages. When the user wearing the speaker is proximate to or facing towards the historical site, the localized audio messages may be recommended to the user via a virtual interface. The one or more localized audio messages may include virtual environment data used to relive historical stories of the historical site. In the virtual environment data, sound data may be properly designed for simulating sound effects of different scenarios. For example, sound may be transmitted from different sound guiding holes to simulate sound effects of different directions. As another example, the volume and/or delay of sound may be adjusted to simulate sound effects at different distances.

Figure 21:
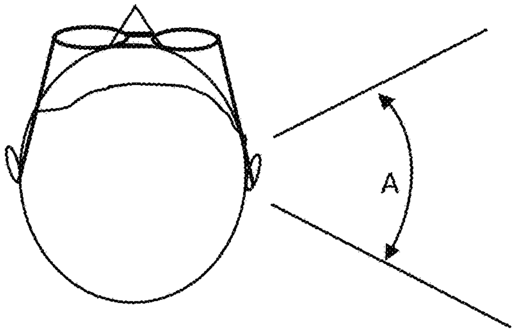
FIG. 21 is a schematic diagram illustrating an exemplary speaker focusing on sounds in a certain direction according to some embodiments of the present disclosure.

Taking a speaker customized for AR as another example, the speaker may determine an audio message related to a POI based at least in part on sensor data obtained by sensors disposed in the speaker. Additionally, the audio message may be combined with real-world sound in ambient environment so as to enhance an audio experience of the user. The real-world sound in ambient environment may include sounds in all directions of the ambient environment, or may be sounds in a certain direction. Merely by way of example, FIG. 21 is a schematic diagram illustrating an exemplary speaker focusing on sounds in a certain direction according to some embodiments of the present disclosure. As illustrated in FIG. 21, when a user is proximate to a POI P, a speaker (e.g., the speaker 1900) worn by the user may focus on sound received from a virtual audio cone. The vertex of the virtual audio cone may be the speaker. The virtual audio cone may have any suitable size, which may be determined by an angle of the virtual audio cone. For example, the speaker may focus on sound of a virtual audio cone with an angle of, for example, 20°, 40°, 60°, 80°, 120°, 180°, 270°, 360°, etc. In some embodiments, to focus on sound within the range of the virtual audio cone, the speaker may improve audibility of most or all sound in the virtual audio cone. For example, an ANR technique may be used by the speaker so as to reduce or substantially prevent sound in other directions (e.g., sounds outside of the virtual audio cones) from being heard by the user. Additionally, the POI may be associated with virtual audio markers to which localized audio messages may be attached. The localized audio messages may be accessed when the user is proximate to or facing towards the POI. That is, the localized audio messages may be overlaid on the sound in the virtual audio cone so as to enhance an audio experience of the user. In some embodiments, a direction and/or a virtual audio cone of the sound focused by the speaker may be determined according to actual needs. For example, the speaker may focus on sound in a plurality of virtual audio cones in different directions simultaneously. As another example, the speaker may focus on sound in a specified direction (e.g., the north direction). As a further example, the speaker may focus on sound in a walking direction and/or a facing direction of the user.

In 2030, the audio message may be replayed. In some embodiments, the audio message may be replayed by the processing engine 1920.

In some embodiments, the processing engine 1920 may replay the audio message via the speaker 1900 directly. In some embodiments, the processing engine 1920 may prompt the user to initiate a playback of the audio message. For example, the processing engine 1920 may output a prompt (e.g., a voice prompt via a sound guiding hole (e.g., one of the one or more sound guiding holes 30), a visual representation via a virtual user-interface) to the user. The user may respond to the prompt by interacting with the speaker 1900. For example, the user may interact with the speaker 1900 using, for example, gestures of his/her body (e.g., head, torso, limbs, eyeballs), voice command, etc.

Figure 22:
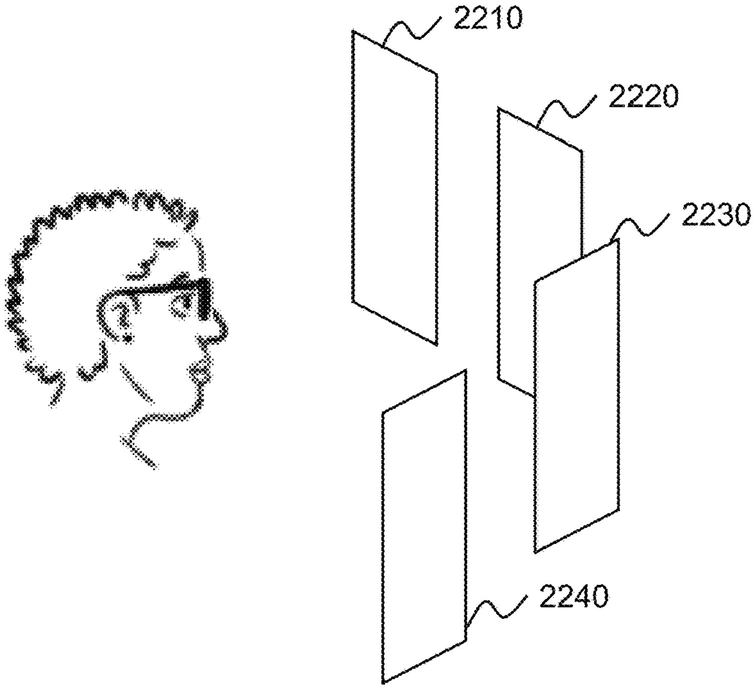
FIG. 22 is a schematic diagram illustrating an exemplary user interface of a speaker according to some embodiments of the present disclosure.

Taking a speaker customized for AR as another example, the user may interact with the speaker via a virtual user-interface (UI). FIG. 22 is a schematic diagram illustrating an exemplary UI of the speaker. As illustrated in FIG. 22, the virtual UI may be present in a head position and/or a gaze direction of the user. In some embodiments, the speaker may provide a plurality of audio samples, information, or choices corresponding to spatially delineated zones (e.g., 2210, 2220, 2230, 2240) in an array defined relative to a physical position of the speaker. Each audio sample or piece of information provided to the user may correspond to an audio message to be replayed. In some embodiments, the audio samples may include a selection of an audio file or stream, such as a representative segment of the audio content (e.g., an introduction to an audio book, a highlight from a sporting broadcast, a description of the audio file or stream, a description of an audio pin, an indicator of the presence of an audio pin, an audio beacon, a source of an audio message). In some embodiments, the audio samples may include entire audio content (e.g., an entire audio file). In some embodiments, the audio samples, information, or choices may be used as prompts for the user. The user may respond to the prompts by interacting with the speaker. For example, the user may click on a zone (e.g., 2220) to initiate a playback of entire audio content corresponding to the audio sample presented in the zone. As another example, the user may shake his/her head to switch between different zones.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. An earphone, comprising:

a sound production component including a housing and a transducer, the transducer residing inside the housing and being configured to generate vibrations, the vibrations producing a sound wave inside the housing; and an ear hook, in a wearing state, the ear hook being used to place the sound production component at a position near an ear canal but not blocking the ear canal, wherein the housing is provided with a sound outlet on an inner side surface towards the auricle for transmitting the sound wave inside the housing through the sound outlet to the ear canal and to surrounding environment, and a ratio of an area of the sound outlet to an area of the inner side surface is in a range of 0.015 to 0.25.

2. The earphone of claim 1, wherein the sound wave transmitted to the surrounding environment forms a leaked sound wave in a target region, and the housing is further provided with a pressure relief hole for guiding a sound wave in the target region, the guided sound wave has a phase different from a phase of the leaked sound wave, and the guided sound wave interfering with the leaked sound wave in the target region.

3. The earphone of claim 1, wherein, in the wearing state, the housing is at least partially inserted into a cavum concha, the sound outlet has a cross-sectional area of 2.87 mm 2 to 46.10 $mm^2$, and the inner side surface has an area of 160 mm 2 to 240 $mm^2$.

4. The earphone of claim 2, wherein a ratio of the cross-sectional area of the sound outlet to a square of a depth of the sound outlet is 10 to 300.

5. The earphone of claim 4, wherein the depth of the sound outlet is in a range of 0.3 mm to 3 mm.

6. The earphone of claim 3, wherein a distance from a center of the sound outlet to a lower side surface of the sound production component is in a range of 4.05 mm to 6.05 mm.

7. The earphone of claim 3, wherein a distance from a center of the sound outlet to a rear side surface of the sound production component is in a range of 8.15 mm to 12.25 mm.

8. The earphone of claim 3, wherein the transducer includes a magnetic circuit assembly, the magnetic circuit assembly is used to provide a magnetic field, and a distance from a center of the sound outlet to a bottom surface of the magnetic circuit assembly is in a range of 5.65 mm to 8.35 mm.

9. The earphone of claim 8, wherein a distance from the center of the sound outlet to a long-axis center plane of the magnetic circuit assembly is in a range of 1.45 mm to 2.15 mm.

10. The earphone of claim 1, wherein a distance from a center of the sound outlet to a plane in which the ear hook is located is in a range of 3 mm to 6 mm.

11. The earphone of claim 1, wherein a ratio of a long-axis dimension of the sound outlet to a short-axis dimension of the sound outlet is in a range of 1 to 10.

12. The earphone of claim 1, wherein a ratio of a long-axis dimension of the sound outlet to a short-axis dimension of the sound outlet is in a range of 2 to 4.

13. The earphone of claim 1, further comprising:

one or more sensors configured to detect status information of a user; and a controller configured to cause the transducer to output sound based on the detected status information of the user.

14. The earphone of claim 13, wherein the one or more sensors include at least one of a locating sensor, an orientation sensor, an inertial sensor, an audio sensor, and a wireless transceiver.

15. The earphone of claim 13, wherein at least one of the one or more sensors is further configured to detect a point of interest (POI) that the user is proximate to or facing towards.

16. The earphone of claim 15, wherein to cause the transducer to output sound based on the detected status information of the user, the controller is further configured to:

determine an audio message related to the POI;

output a prompt to the user; and cause the transducer to replay the audio message in response to the user responding to the prompt.

17. The earphone of claim 15, wherein the POI is a virtual audio marker with which the audio message is associated.

18. The earphone of claim 16, wherein the prompt includes a voice prompt via the sound outlet or a visual representation via a virtual user-interface.

19. The earphone of claim 16, wherein the user responds to the prompt via a virtual user-interface.

20. The earphone of claim 17, wherein the controller is further configured to determine, based on the detected status information of the user, whether the user is proximate to the POI or facing towards the POI.

* * * * *